(12) United States Patent
Christensen et al.

(10) Patent No.: US 10,568,387 B2
(45) Date of Patent: Feb. 25, 2020

(54) METHOD OF MAKING AN ARTICLE OF FOOTWEAR WITH EXTRUDED COMPONENTS

(71) Applicant: REEBOK INTERNATIONAL LIMITED, London (GB)

(72) Inventors: Brian Christensen, Centerville, MA (US); Paul Davis, Blackstone, MA (US); Ricardo Vestuti, Providence, RI (US); Henry Hardigan, Pawtucket, RI (US); Dennis Gaboriault, Millbury, MA (US)

(73) Assignee: Reebok International Limited, London (GB)

( * ) Notice: Subject to any disclaimer, the term of this patent is extended or adjusted under 35 U.S.C. 154(b) by 0 days.

(21) Appl. No.: 16/047,821

(22) Filed: Jul. 27, 2018

(65) Prior Publication Data
US 2019/0014862 A1 Jan. 17, 2019

Related U.S. Application Data

(63) Continuation of application No. 15/644,463, filed on Jul. 7, 2017.

(51) Int. Cl.
*B29C 48/15* (2019.01)
*A43B 23/02* (2006.01)
(Continued)

(52) U.S. Cl.
CPC ............ *A43B 23/0295* (2013.01); *A43B 1/04* (2013.01); *A43B 13/127* (2013.01); *A43B 13/186* (2013.01); *A43B 13/188* (2013.01); *A43B 23/025* (2013.01); *A43B 23/027* (2013.01); *A43B 23/0215* (2013.01); *A43B 23/0255* (2013.01); *A43B 23/0275* (2013.01); *A43B 23/088* (2013.01); *B29C 48/15* (2019.02);
(Continued)

(58) Field of Classification Search
None
See application file for complete search history.

(56) References Cited

U.S. PATENT DOCUMENTS 2,100,492 A 11/1937 Sindler
2,325,656 A 8/1943 Brophy
(Continued)

FOREIGN PATENT DOCUMENTS

CN 1066620 C 6/2001
CN 101820788 A 9/2001
(Continued)

OTHER PUBLICATIONS

Extended European Search Report for Application EP15180119.8, Applicant: Reebok International Limited, dated Dec. 11, 2015.
(Continued)

*Primary Examiner* — Edmund H Lee
(74) *Attorney, Agent, or Firm* — Sterne, Kessler, Goldstein & Fox P.L.L.C.

(57) ABSTRACT

An upper for an article of footwear includes a first upper panel, a second upper panel, and an extruded component. The extruded component is disposed along a border between the first upper panel and the second upper panel. The extruded component joins the first upper panel to the second upper panel.

16 Claims, 37 Drawing Sheets

(51) Int. Cl.
*B29C 65/62* (2006.01)
*B29C 48/156* (2019.01)
*B29C 65/50* (2006.01)
*B33Y 80/00* (2015.01)
*B29C 48/151* (2019.01)
*B29C 48/155* (2019.01)
*A43B 1/04* (2006.01)
*A43B 13/12* (2006.01)
*A43B 13/18* (2006.01)
*A43B 23/08* (2006.01)

(52) U.S. Cl.
CPC .......... *B29C 48/151* (2019.02); *B29C 48/155* (2019.02); *B29C 48/156* (2019.02); *B29C 65/50* (2013.01); *B29C 65/62* (2013.01); *B33Y 80/00* (2014.12)

(56) References Cited

U.S. PATENT DOCUMENTS

| | | | |
|---|---|---|---|
| 3,251,728 | A | 5/1966 | Humbert et al. |
| 3,719,965 | A | 3/1973 | Chevallereau |
| 3,911,173 | A * | 10/1975 | Sprague, Jr. ......... A43D 25/183 12/142 R |
| 4,272,898 | A | 6/1981 | Tansill |
| 4,272,989 | A | 6/1981 | Rymarchyk et al. |
| 4,431,311 | A | 2/1984 | Kolossow |
| 4,536,974 | A | 8/1985 | Cohen |
| 4,593,482 | A | 6/1986 | Mayer |
| 4,611,412 | A | 9/1986 | Cohen |
| 4,753,021 | A | 6/1988 | Cohen |
| 4,754,559 | A | 7/1988 | Cohen |
| 4,952,450 | A | 8/1990 | Noel |
| 5,063,018 | A | 11/1991 | Fontirroche et al. |
| 5,233,767 | A | 8/1993 | Kramer |
| 5,713,140 | A | 2/1998 | Baggenstoss |
| 5,916,006 | A | 6/1999 | Ganson |
| 6,280,478 | B1 | 8/2001 | Richter et al. |
| 6,782,642 | B2 | 8/2004 | Knoche et al. |
| 7,192,069 | B1 | 3/2007 | Daniel |
| 7,926,204 | B2 | 4/2011 | Ungari et al. |
| 8,993,061 | B2 | 3/2015 | Jones et al. |
| 2006/0288612 | A1 | 12/2006 | Lucas et al. |
| 2007/0170610 | A1 | 7/2007 | Payne et al. |
| 2007/0266593 | A1 | 11/2007 | Schindler et al. |
| 2008/0271339 | A1 | 11/2008 | Fischer |
| 2009/0013558 | A1 | 1/2009 | Hazenberg et al. |
| 2009/0094858 | A1 | 4/2009 | Ungari et al. |
| 2009/0126225 | A1 | 5/2009 | Jarvis |
| 2009/0247658 | A1 | 10/2009 | Kobayashi et al. |
| 2011/0016746 | A1 | 1/2011 | Callahan et al. |
| 2011/0154584 | A1 | 6/2011 | Ungari et al. |
| 2011/0232130 | A1 | 9/2011 | Boudreau et al. |
| 2012/0180344 | A1 | 7/2012 | Crowley, II et al. |
| 2013/0145650 | A1 | 6/2013 | Seo |
| 2013/0260104 | A1 | 10/2013 | Dua et al. |
| 2014/0020192 | A1 | 1/2014 | Jones et al. |
| 2014/0230276 | A1 | 8/2014 | Campos, II et al. |
| 2015/0040428 | A1 | 2/2015 | Davis et al. |
| 2016/0219982 | A1 | 8/2016 | Waatti |

FOREIGN PATENT DOCUMENTS

| | | |
|---|---|---|
| CN | 1817261 A | 8/2006 |
| DE | 1279314 B | 10/1968 |
| EP | 0130816 A2 | 1/1985 |
| EP | 2 684 479 A2 | 1/2014 |
| WO | WO 97/03582 A1 | 2/1997 |
| WO | WO 2009/057107 A2 | 5/2009 |
| WO | WO 2014/100462 A1 | 6/2014 |
| WO | WO 2017/083013 A1 | 5/2017 |

OTHER PUBLICATIONS

European Search Report for European Application No. 16198878.7, European Patent Office, Munich, Germany, dated Apr. 21, 2017, 9 pages.

* cited by examiner

METHOD OF MAKING AN ARTICLE OF FOOTWEAR WITH EXTRUDED COMPONENTS

CROSS-REFERENCE TO RELATED APPLICATION

This application is a continuation of U.S. patent application Ser. No. 15/644,463, filed Jul. 7, 2017 and entitled, "Article of Footwear with Extruded Components," the disclosure of which is incorporated herein in its entirety by reference thereto.

BACKGROUND

Field

Embodiments of the present invention relate generally to articles of footwear; and more specifically to articles of footwear with extruded (e.g., dispensed) components.

Background

Individuals can be concerned with the amount of cushioning an article of footwear provides, as well as the aesthetic appeal of the article of footwear. This is true for articles of footwear worn for non-performance activities, such as a leisurely stroll, and for performance activities, such as running, because throughout the course of an average day, the feet and legs of an individual are subjected to substantial impact forces. When an article of footwear contacts a surface, considerable forces may act on the article of footwear and, correspondingly, the wearer's foot.

The human foot is a complex and remarkable piece of machinery, capable of withstanding and dissipating many impact forces. The natural padding of fat at the heel and forefoot, as well as the flexibility of the arch, help to cushion the foot. Although the human foot possesses natural cushioning and rebounding characteristics, the foot alone is incapable of effectively overcoming many of the forces encountered during every day activity. Unless an individual is wearing footwear that provides proper cushioning, support, and flexibility, the soreness and fatigue associated with every day activity is more acute, and its onset accelerated. The discomfort for the wearer that results may diminish the incentive for further activity. Also, inadequate cushioning, support, or flexibility in an article of footwear can lead to injuries such as blisters; muscle, tendon, and ligament damage; and bone stress fractures. Improper footwear can also lead to other ailments, including back pain.

BRIEF SUMMARY

Articles of footwear with extruded (e.g., dispensed) components are disclosed. The components may be formed via an automated dispensing process that is done robotically. In some embodiments, an upper for an article of footwear includes a first upper panel, a second upper panel, and an extruded component. In some embodiments, the extruded component is disposed along a border between the first upper panel and the second upper panel. In some embodiments, the extruded component joins the first upper panel to the second upper panel.

In some embodiments, the extruded component is polyurethane (or another suitable polymeric material). In some embodiments, a material of the first upper panel is different than a material of the second upper panel. In some embodiments, the extruded component forms a portion of a closure system for the article of footwear. In some embodiments, the upper also includes a seam joining the first upper panel and the second upper panel.

In some embodiments, the extruded component is disposed on an exterior surface of the first upper panel and the second upper panel. In some embodiments, the extruded component forms an exterior surface of the upper.

In some embodiments, the upper also includes a third upper panel and an additional extruded component. In some embodiments, the additional extruded component is disposed along a border between the first upper panel and the third upper panel. In some embodiments, the additional extruded component joins the first upper panel to the third upper panel.

In some embodiments, an article of footwear includes a sole, an upper having a plurality of panels, and an upper extruded component joining two adjacent panels of the plurality of panels together. In some embodiments, the two adjacent panels are joined together only by the upper extruded component.

In some embodiments, the upper extruded component joins each of the plurality of panels to adjacent panels. In some embodiments, each of the plurality of panels are joined together only by the upper extruded component.

In some embodiments, the sole includes a sole extruded component. In some embodiments, the sole extruded component is a ground-contacting surface of the article of footwear. In some embodiments, the sole extruded component extends from a heel area of the article of footwear to a toe area of the article of footwear. In some embodiments, the sole extruded component may be discontinuous (e.g., separate heel and forefoot extruded components). In some embodiments, the sole extruded component may be positioned only in a portion of the article of footwear (e.g., heel area only, midfoot area only, forefoot area only, or a combination thereof). In some embodiments, the sole extruded component extends above the sole to form a closure system for the article of footwear.

In some embodiments, the plurality of panels includes at least ten panels. In some embodiments, at least one panel of the plurality of panels is a heel counter.

In some embodiments, a method of making an upper includes shaping a first panel to form part of the upper, shaping a second panel to form another part of the upper, placing the first panel adjacent to the second panel, and extruding a component along a border between the first panel and the second panel to join the first panel and the second panel together.

In some embodiments, placing the first panel adjacent to the second panel includes abutting the first panel against the second panel. In some embodiments, the method also includes shaping additional panels to form parts of the upper and extruding the component along borders between the additional panels, the first panel, and the second panel to join each of the panels to form the entire upper. In some embodiments, the first panel completely surrounds the second panel.

BRIEF DESCRIPTION OF THE DRAWINGS

The accompanying drawings, which are incorporated herein and form a part of the specification, illustrate the present invention and, together with the description, further serve to explain the principles of the invention and to enable a person skilled in the pertinent art to make and use the invention.

DETAILED DESCRIPTION

Figure 1:
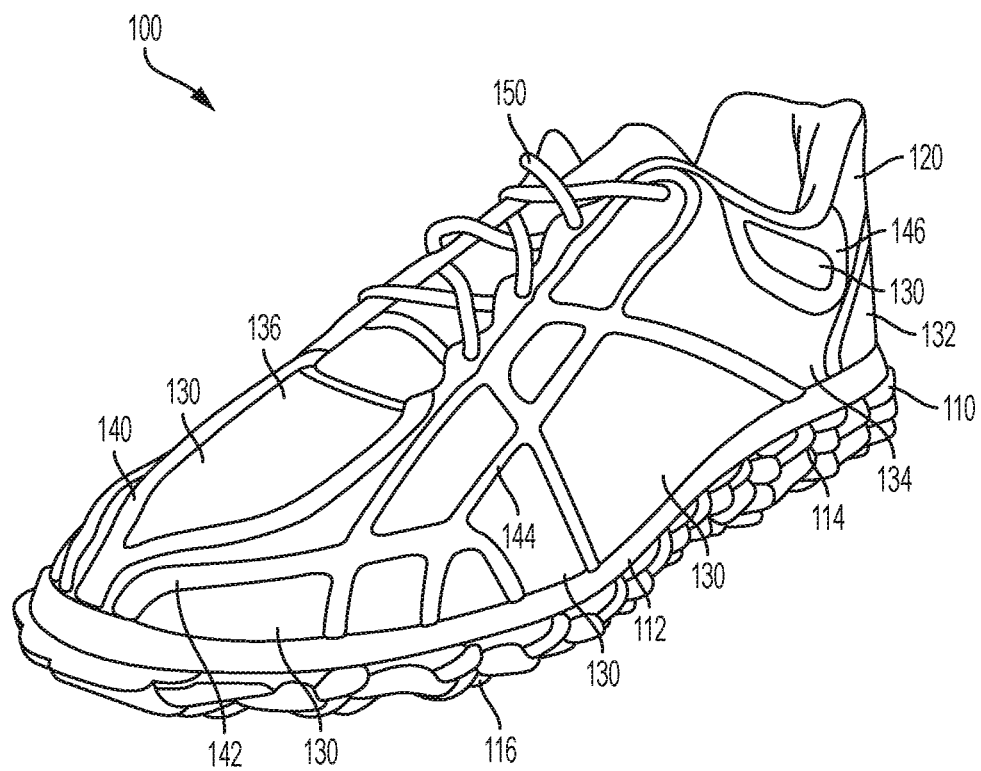
FIG. 1 shows a perspective view of an article of footwear according to some embodiments.
Figure 2:
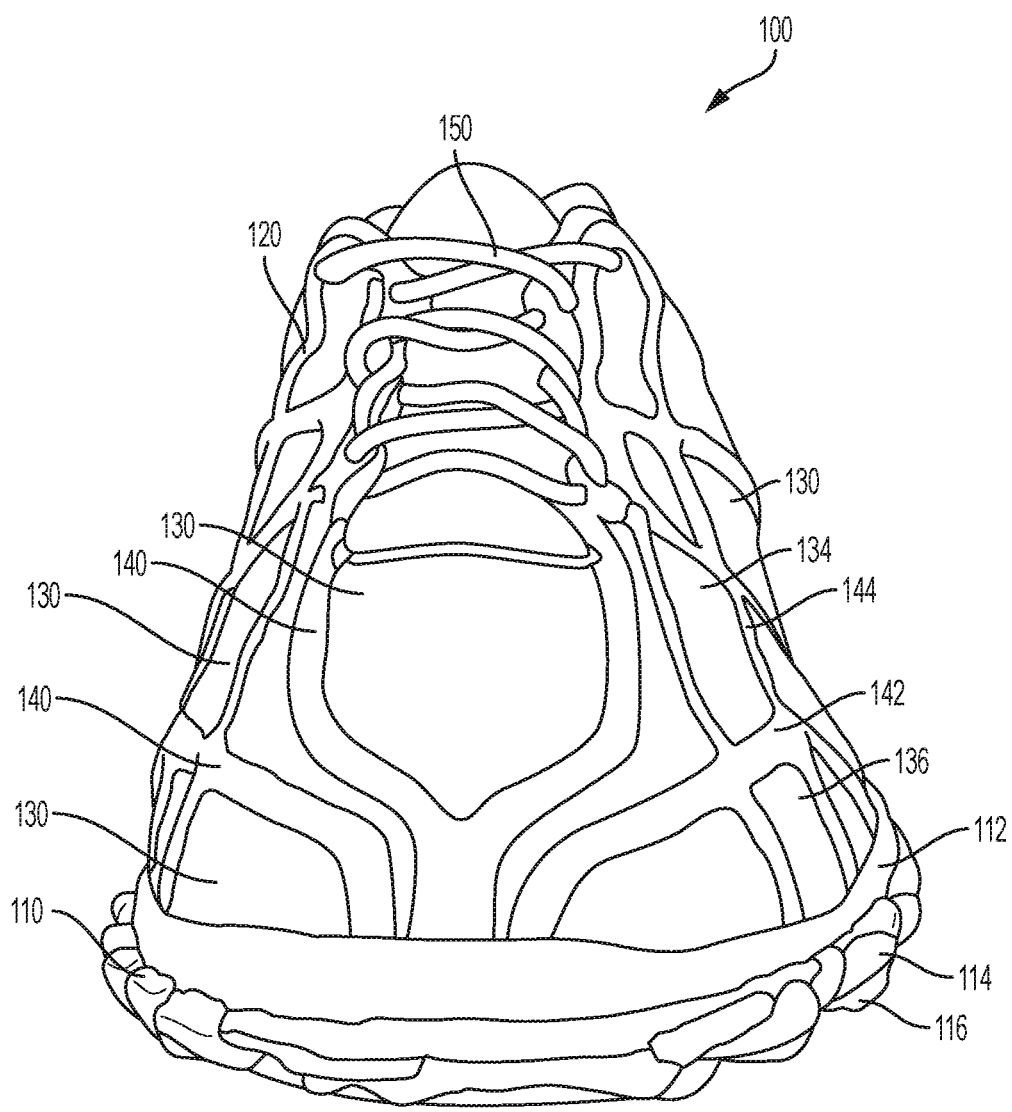
FIG. 2 shows a front view of an article of footwear according to some embodiments.
Figure 3:
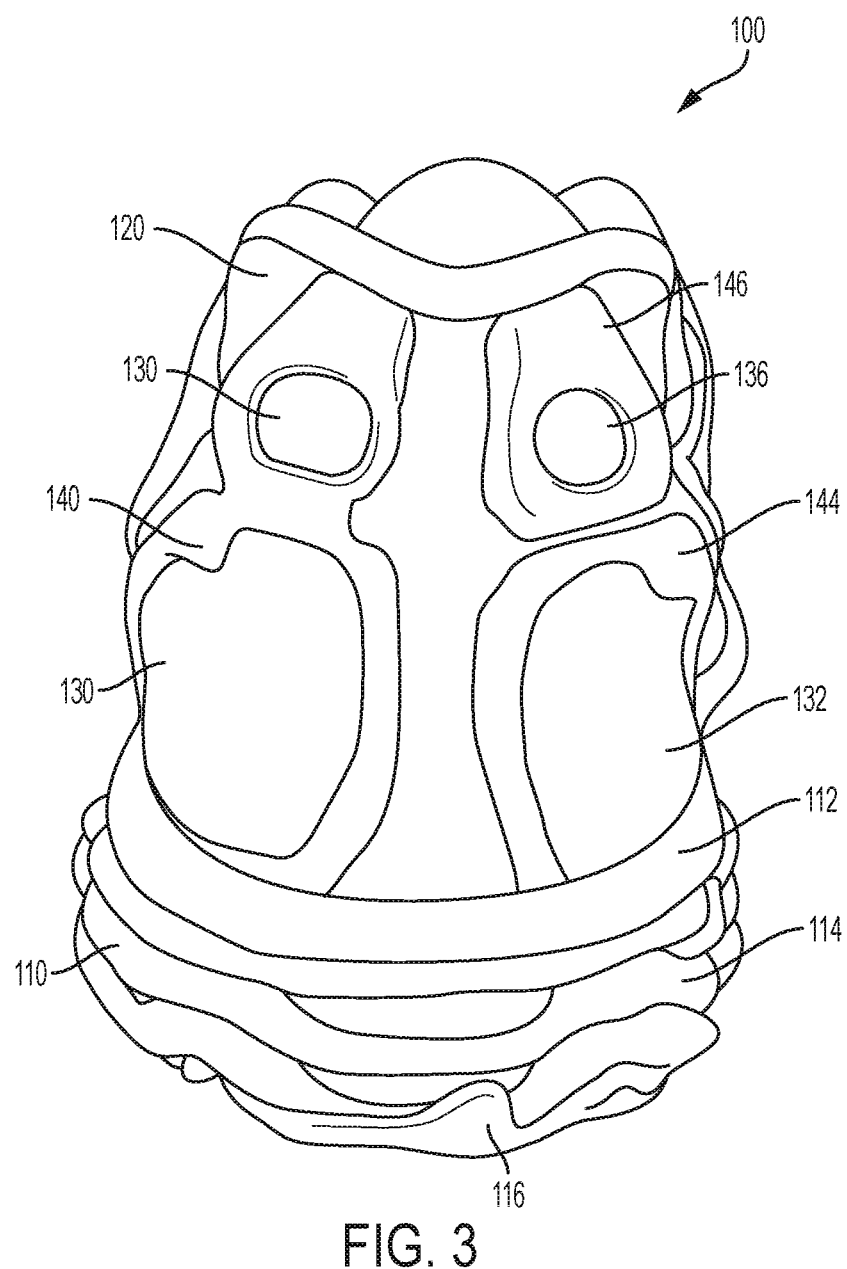
FIG. 3 shows a back view of an article of footwear according to some embodiments.

The present invention will now be described in detail with reference to embodiments thereof as illustrated in the accompanying drawings, in which like reference numerals are used to indicate identical or functionally similar elements. References to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The term "invention" or "present invention" as used herein is a non-limiting term and is not intended to refer to any single embodiment of the particular invention but encompasses all possible embodiments as described in the application.

The following examples are illustrative, but not limiting, of the present invention. Other suitable modifications and adaptations of the variety of conditions and parameters normally encountered in the field, and which would be apparent to those skilled in the art, are within the spirit and scope of the invention.

Embodiments of the present invention provide articles of footwear having one or more extruded components created by an automated dispensing process. It is understood that while the term "extruded" is generally used herein to refer to certain materials, these materials may also be "dispensed," for example, dispensed from a mechanical device. Thus, the term "extruded component" includes components that are extruded and components that are dispensed.

In some embodiments, an upper and/or a sole of the article of footwear may have one or more extruded components. In some embodiments, an upper and/or a sole, or portions thereof, can be formed from one or more extruded components. In some embodiments, the extruded component can be a single, continuous piece of solid material. An extruded footwear component can have advantages over traditionally-formed components, such as those made by casting, pouring, injection molding, screen-printing, or thermo-plastically forming. For example, an extruded component can be customized without having to machine a new, expensive mold. The use of extruded components can also allow for the use of shapes and geometries that are difficult to achieve using conventional upper or bottom molding techniques. Moreover, the data and knowledge to make an extruded component can be quickly deployed to any location that houses equipment and material suitable for processing.

Various physical properties of the extruded component can be manipulated, adjusted, altered, and/or modified. For example, in some embodiments, the width, length, shape, wall thickness, color, density, elasticity, material, viscosity, hardness, etc. of the extruded component can vary along the extruded component or between a first and second extruded component. As an example, an extruded component on an upper may be less viscous than an extruded component on a sole, which can help the extruded component on the upper lay flat. As another example, an extruded upper component may be rigid in a first portion, flexible in a second portion that is continuous with the first portion, and rigid in a third portion that is continuous with the first portion. The extruded upper component may similarly vary in other characteristics, such as color.

In some embodiments, the extruded component can be made of rubber, foam (e.g., dispensed polyurethane foam), silicone, plastic including thermoplastic (e.g., polyurethane (such as TPU), nylon, or polypropylene), or any other suitable material. In some embodiments, the extruded component can be made of a composite material. In some embodiments, the cross-section of the extruded component can be substantially circular, oval, rectangular, triangular, square, or any other suitable shape or design (e.g., star-shaped). In some embodiments, the cross-section of the extruded component can be relatively flat (i.e., low profile). Moreover, the cross-section of the extruded component may be adjusted dynamically and may vary throughout the automated dispensing process.

In some embodiments, the extruded component can be extruded directly onto the article of footwear, such as directly onto the sole (e.g., insole, midsole, and/or outsole) or the upper. For example, the extruded component can be extruded or dispensed directly onto a formed upper on a last (e.g., a flat knit upper, a circular knit upper, a formed three-dimensional knit, a sock, a fully-finished traditionally-lasted upper, etc.). The upper may be made of a textile fabric, leather, synthetic, or film product. In some embodiments, the extruding or dispensing is done automatically (i.e., robotically). In some embodiments, a scanner may scan the upper and then robotically dispense the extruded component onto the upper based on the scan.

In some embodiments, the extruded component can be used to partially or completely join a plurality of panels together to form the upper. In some embodiments, the extruded component can be extruded along the border between two panels. In some embodiments, the extruded component may bond (e.g., by thermal fusion, chemical adhesion, or mechanical locking) to a portion of the article of footwear (e.g., one or more panels). In some embodiments, a portion of the extruded component may bond to the article of footwear, while another portion of the extruded component does not bond to the article of footwear.

In some embodiments, the extruded component may form an upper support element for the article of footwear. In some embodiments, the extruded component may be used as part of a closure system for the article of footwear. For example, the extruded component may support laces or other securement straps for securing the article of footwear to the wearer.

In some embodiments, the article of footwear may include or utilize any of the extruded components or other features disclosed in U.S. application Ser. No. 14/455,650, filed Aug. 8, 2014, and/or U.S. application Ser. No. 14/945,077, filed Nov. 18, 2015, the disclosures of which are incorporated herein in their entireties by reference thereto.

In some embodiments, extruded components may be extruded directly onto other portions of an article of footwear, such as article of footwear 100 shown in FIGS. 1-7. In some embodiments, article of footwear 100 may include a sole 110 and an upper 120. In some embodiments, sole 110 and/or upper 120 include an extruded component. The component may be extruded onto a surface so as to provide an extruded component that extends above the surface at a certain width and height profile. In some embodiments, the height, width, or geometry or physical appearance/characteristic of the extruded components may be dynamically changed as the components are extruded onto article of footwear 100, such as onto upper 120. In some embodiments, the geometry or physical appearance/characteristics of the extruded components may be changed by dynamically changing the height of the nozzle (relative to the dispensing surface or substrate) from which the material, used to form the component, is extruded. In some embodiments, the geometry or physical appearance/characteristics of the extruded components may be changed by dynamically changing the speed at which the nozzle is moving as the material is extruded and the component is formed. In some embodiments, the geometry or physical appearance/characteristics of the extruded components may be changed by dynamically changing the flow rate of the material that is extruded. Other parameters may be changed to dynamically change the height, width, or other characteristic of the extruded components. In some embodiments, the density or viscosity of the extruded components may be changed. For example, a low density extruded component may be used to form a collar of the upper 120.

In some embodiments, upper 120 has one or more panels 130 and one or more upper extruded components 140 that define all or a portion of the area of the upper. In some embodiments, panels 130 comprise individual textile pieces. In some embodiments, panels 130 may be made of leather, synthetic leather, plastic (e.g., thermoplastic film), mesh, textile, knit-goods, woven-goods, non-woven, or other suitable materials. In some embodiments, panels 130 may be made of a knitted or woven fabric. In some embodiments, panels 130 may be made of a non-knitted or non-woven fabric. In some embodiments, upper 120 is a knit upper. In some embodiments, upper 120 is a circular knit upper. For example, a portion or the entirety of upper 120 may be circular knit. In some embodiments, upper 120 is a 360 degree circular knit upper. In some embodiments, upper 120 is a flat knit upper. For example, a portion or the entirety of upper 120 may be flat knit.

In some embodiments, upper 120 comprises at least five panels 130. In some embodiments, upper 120 comprises at least ten panels 130. In some embodiments, panels 130 may differ from one another in size, shape, material, and/or other characteristics. In some embodiments, the characteristics vary based on desired functions of article of footwear 100 at particular locations. For example, in some embodiments, upper 120 comprises one or more panels 132 configured to provide additional support, such as in a heel region of upper 120. In some embodiments, panels 132 comprise a heel counter (see FIG. 3). In some embodiments, upper comprises one or more panels 134 made of a first material and one or more panels 136 made of a second material. In some embodiments, panels 134 are made of a knitted fabric and panels 136 are made of a non-knitted fabric.

In some embodiments, upper extruded components 140 are extruded directly onto upper 120 (e.g., panels 130 of upper 120) to form a portion of upper 120. In some embodiments, upper extruded components 140 may have a lower viscosity than other extruded components (e.g., extruded components in sole 110). Accordingly, upper extruded components 140 may be relatively flat on upper 120 (see, e.g., FIG. 2). In some embodiments, upper extruded components 140 are disposed on an exterior portion of article of footwear 100. In some embodiments, upper extruded components 140 form an exterior portion of article of footwear 100.

In some embodiments, upper extruded components 140 provide aesthetic and functional features of article of footwear 100. In some embodiments, upper extruded components 140 may form a pattern on upper 120. In some embodiments, upper extruded components 140 may be a single, continuous element. In some embodiments, upper extruded components 140 may include a plurality of continuous elements. In some embodiments, upper extruded components 140 include one or more extruded components 142 that are disposed along a border (i.e., transition) between two or more panels 130 or an area of overlap between two or more panels 130, one or more extruded components 144 that are disposed across (but not along a border between) one or more panels 130, and one or more extruded components 146 that completely surround a panel 130 along the border of panel 130. In some embodiments, a single upper extruded component 140 may form both an extruded component 142 and an extruded component 144. In some embodiments, a single upper extruded component 140 may form both an extruded component 142 and an extruded component 146. In some embodiments, a single upper extruded component 140 may form both an extruded component 144 and an extruded component 146.

In some embodiments, upper extruded components 140 form part of a closure system for article of footwear. For example, as shown in FIG. 1, laces 150 extend through upper 120 between portions of upper extruded component 144. This may strengthen the hole that receives laces 150. In some embodiments, upper extruded components 140 may provide a loop to receive laces 150. In some embodiments, extruded components may support other components configured to receive laces 150.

In some embodiments, upper extruded components 140 (e.g., extruded component 142, extruded component 144, or extruded component 146) join two or more panels 130 together. In some embodiments, upper extruded components 140 are the only means for joining panels 130 together (i.e., panels 130 are not sewn, joined with an adhesive, joined with low-melt film, laser-welded, ultrasonically welded, radio-frequency welded, or otherwise joined together except by upper extruded components 140). In some embodiments, panels 130 are joined together by upper extruded components 140 as well as being sewn, joined with an adhesive, laser-welded, ultrasonically welded, or radio-frequency welded.

In some embodiments, two or more panels 130 are joined together or coupled at a seam. In some embodiments, the seam may include one or more of upper extruded component 140, adhesive, stitching, or another suitable redundant joining method. In some embodiments, the seam is a stitchless seam. In some embodiments, the seam is a stitchless seam with an overlay. In some embodiments, the seam is a butt seam. In some embodiments, the seam is a hidden seam (e.g., closed seam). In some embodiments, the seam is covered with seam tape. For example, the seam may include upper extruded component 140 on an outer surface of upper 120 and seam tape on an inner surface of upper 120. In some embodiments, the seam comprises an area of overlap between the two panels 130.

Figure 8:
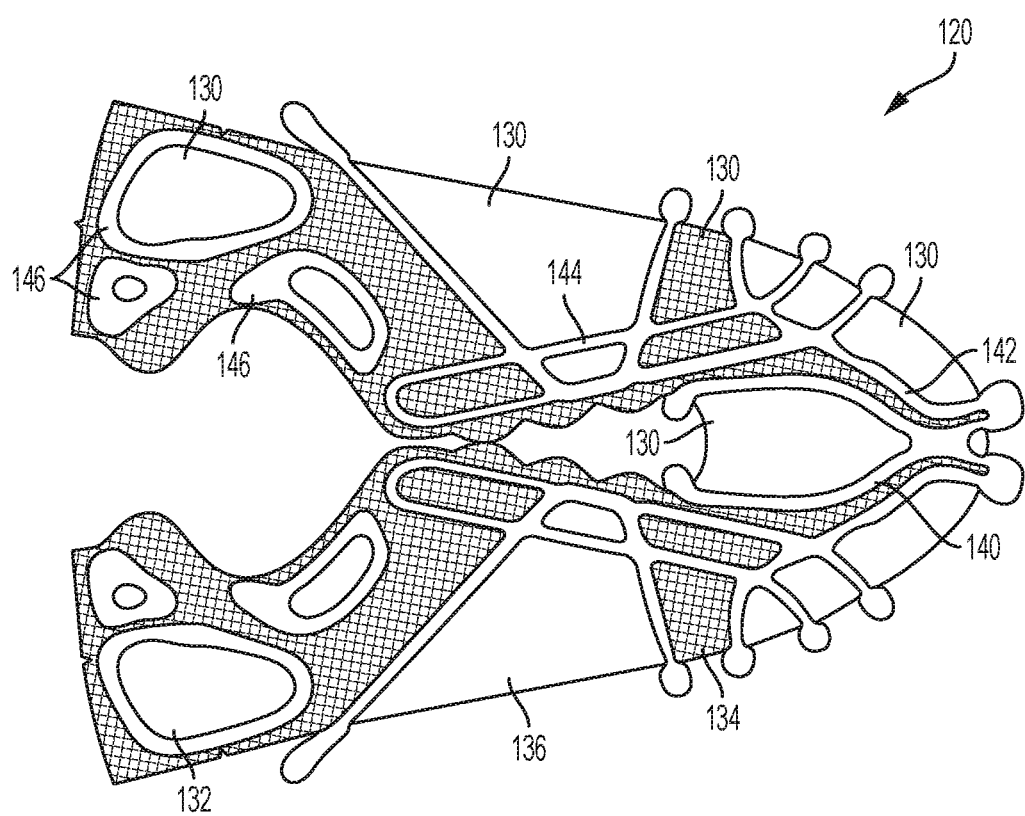
FIG. 8 shows a top view of an upper layout for an article of footwear according to some embodiments.
Figure 9:
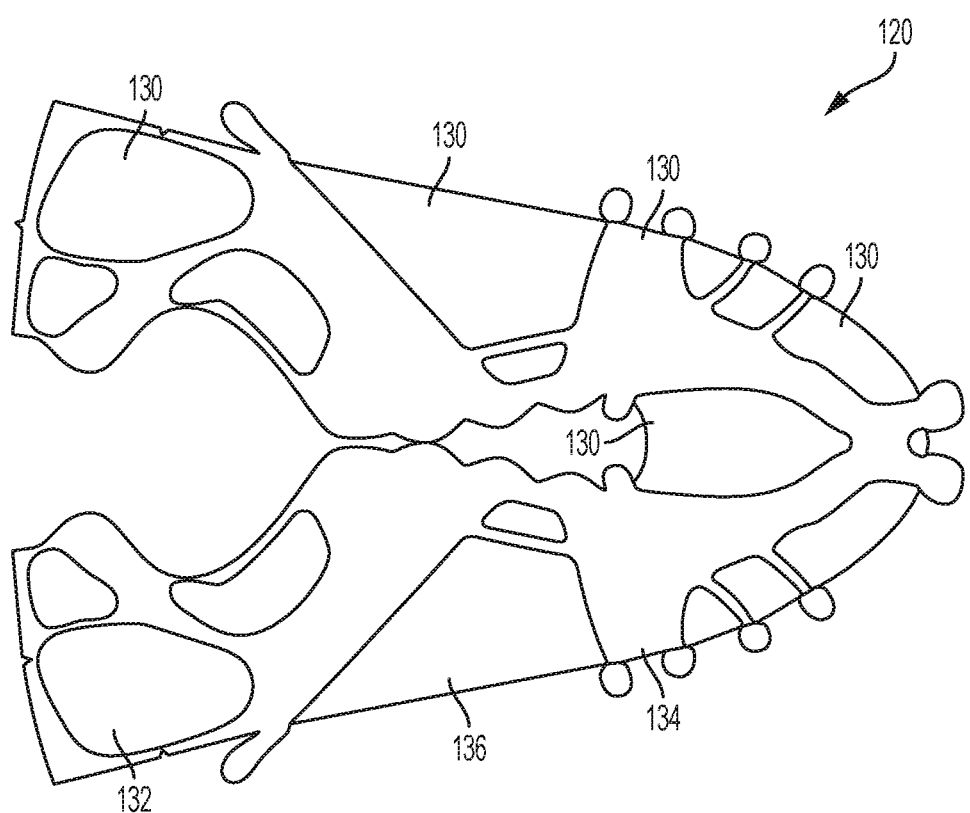
FIG. 9 shows a bottom view of an upper layout for an article of footwear according to some embodiments.

For example, a layout for an upper 120 is shown in FIGS. 8 and 9. The various panels 130 making up upper 120 (including panels 132, panels 134, and panels 136) are joined together by upper extruded components 140. Some of upper extruded components 140 extend along the border between panels 130 (i.e., extruded components 142). Some of upper extruded components 140 extend across multiple panels 130, but not along a border between panels 130 (i.e., extruded components 144). Some of upper extruded components 140 extend to completely surround a panel 130 (i.e., extruded components 146). As shown on the inner side of upper 120 (see FIG. 9), no additional element or means (other than upper extruded components 140) joins panels 130 together.

Figure 10:
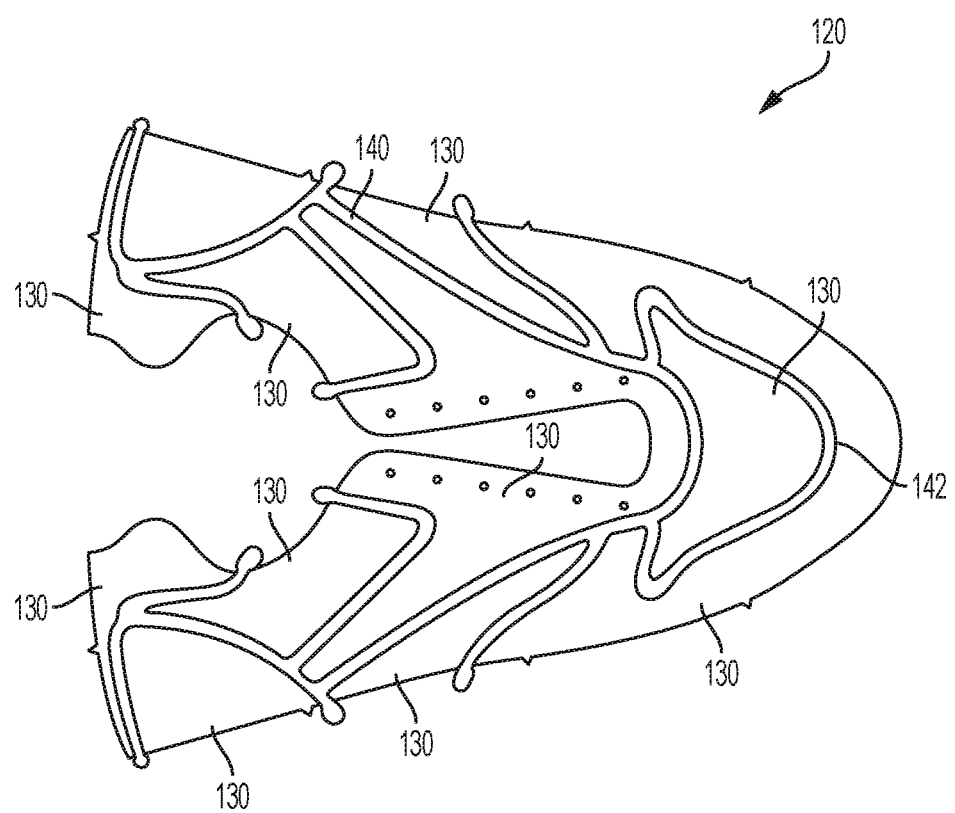
FIG. 10 shows a top view of an upper layout for an article of footwear according to some embodiments.
Figure 11:
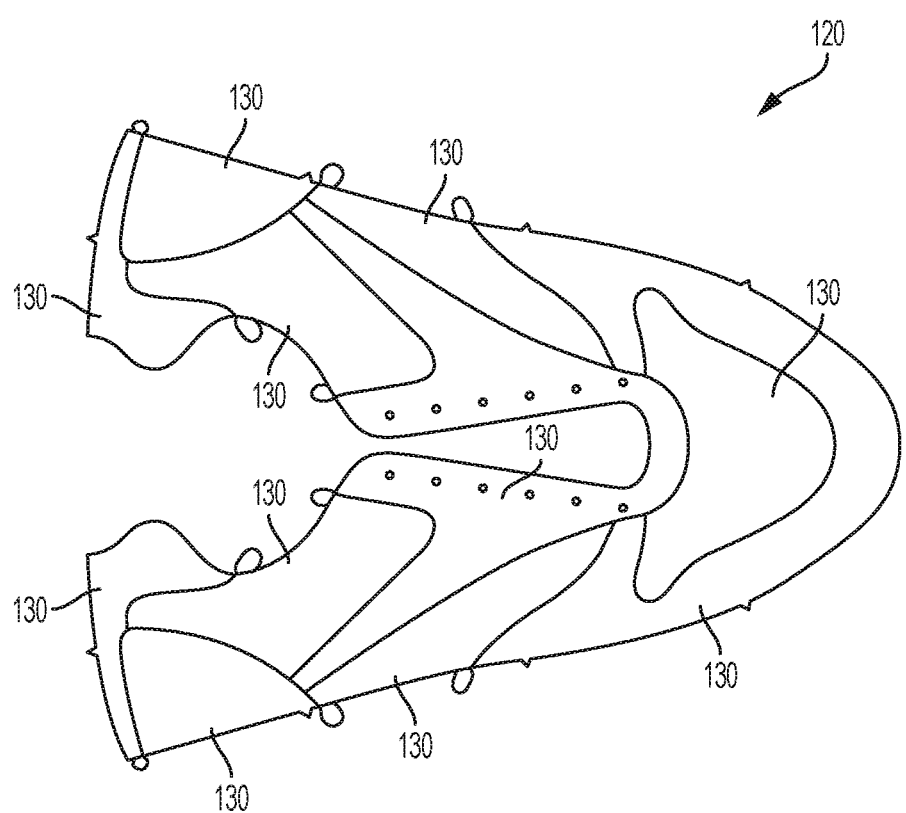
FIG. 11 shows a bottom view of an upper layout for an article of footwear according to some embodiments.

The placement of upper extruded components 140 is not limited to a particular design or configuration. Instead, upper extruded components 140 may be dispensed in a desired location to provide a desired function or aesthetic. An additional example of upper 120 is provided in FIGS. 10 and 11. In some embodiments, as shown in FIGS. 10 and 11, all upper extruded components 140 are extruded components 142 (i.e., all upper extruded components 140 extend along a border between panels 130). As shown on the inner side of upper 120 (see FIG. 11), no additional element or means (other than upper extruded components 140) joins panels 130 together.

In some embodiments, upper 120 is made by shaping a plurality of panels 130 to form parts of the upper. In some embodiments, a first panel 130 may be shaped to form part of upper 120. For example, the first panel 130 may be cut to a particular shape. In some embodiments, a second panel 130 may also be shaped to form another part of upper 120, for example, by cutting. In some embodiments, the first and second panels 130 may be placed adjacent to each other. For example, the first panel 130 may be abutted against the second panel 130 to form a border. In some embodiments, a component 140 is extruded along a border between the first and second panels 130. As extruded component 140 hardens, extruded component 140 bonds with first and second panels 130 and thus joins first and second panels 130 together. In some embodiments, component 140 is extruded onto panels 130 in a flat configuration. In some embodiments, component 140 is extruded onto panels 130 in a three dimensional configuration (e.g., onto a contoured surface). For example, component 140 may be extruded onto panels 130 when panels 130 are on a shoe last, a foot form, or any other three-dimensional form suitable for holding panels 130. While only two panels 130 are discussed here, additional panels 130 may be shaped to form other parts of upper 120 and components 140 may be extruded along each of the borders between panels 130 to join panels 130 together to form the entire upper 120. In some embodiments, one panel 130 may completely surround another panel 130.

In some embodiments, as shown, for example, in FIGS. 1-7, sole 110 comprises various layers of extruded components. In some embodiments, sole 110 can provide the desired ride and feel characteristics to the wearer. In some embodiments, sole 110 can minimize the weight of article of footwear 100; control the flexion, resilience, and support of article of footwear 100; and provide customized desired cushioning and shape for an article of footwear 100. In some embodiments, sole 110 comprises an extruded component 112. In some embodiments, extruded component 112 is disposed at the junction between sole 110 and upper 120. In some embodiments, extruded component 112 forms an outer edge of sole 110 and/or upper 120. In some embodiments, extruded component 112 is one continuous component that surrounds article of footwear 100.

Figure 4:
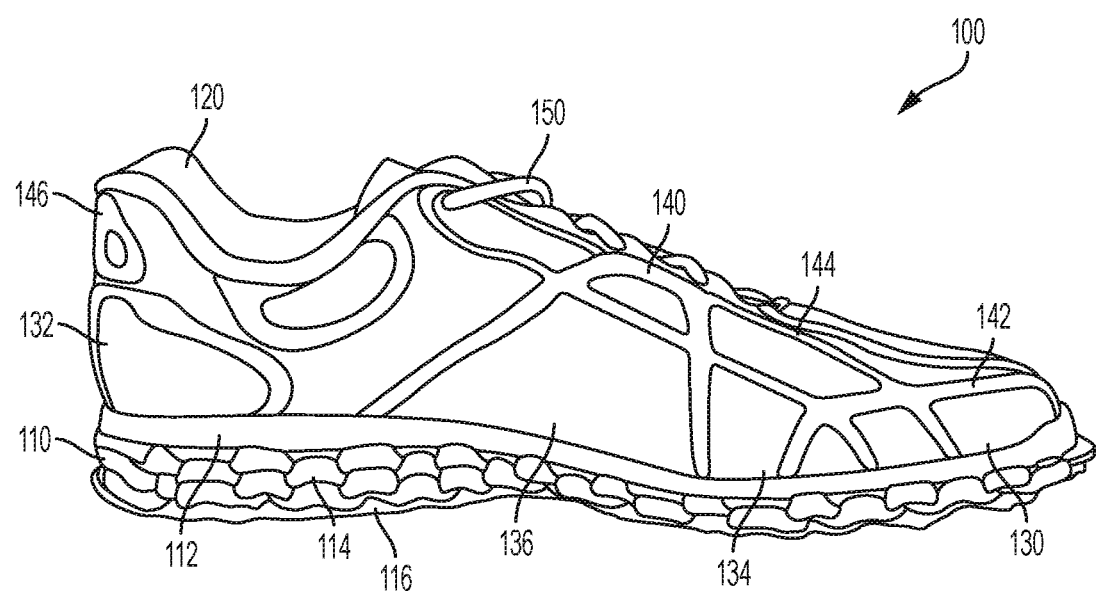
FIG. 4 shows a medial side view of an article of footwear according to some embodiments.
Figure 5:
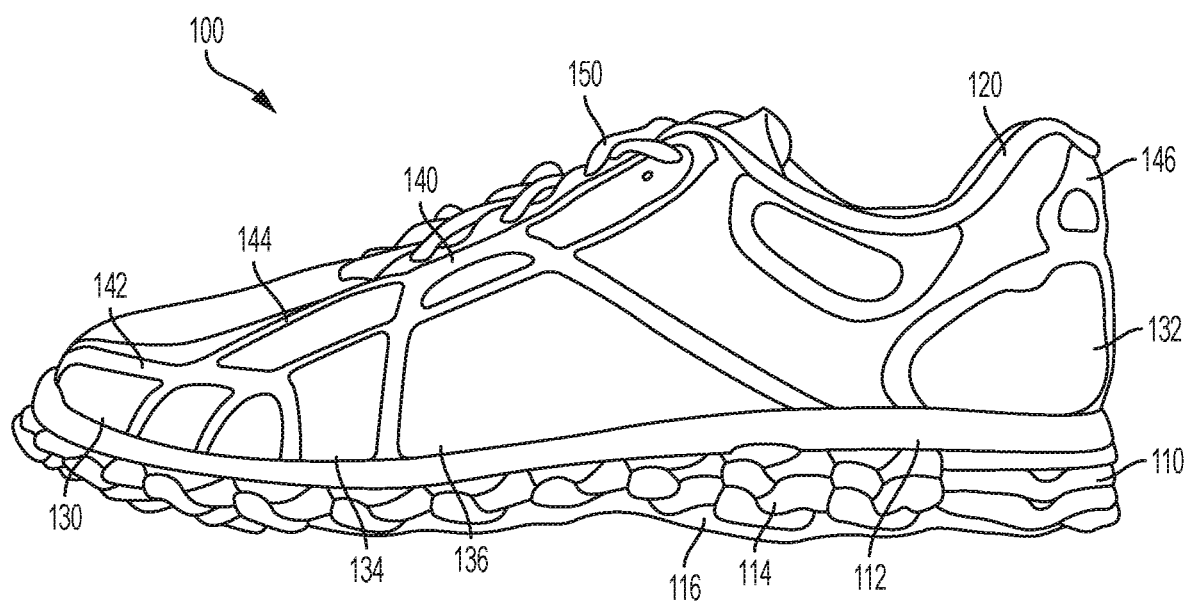
FIG. 5 shows a lateral side view of an article of footwear according to some embodiments.
Figure 6:
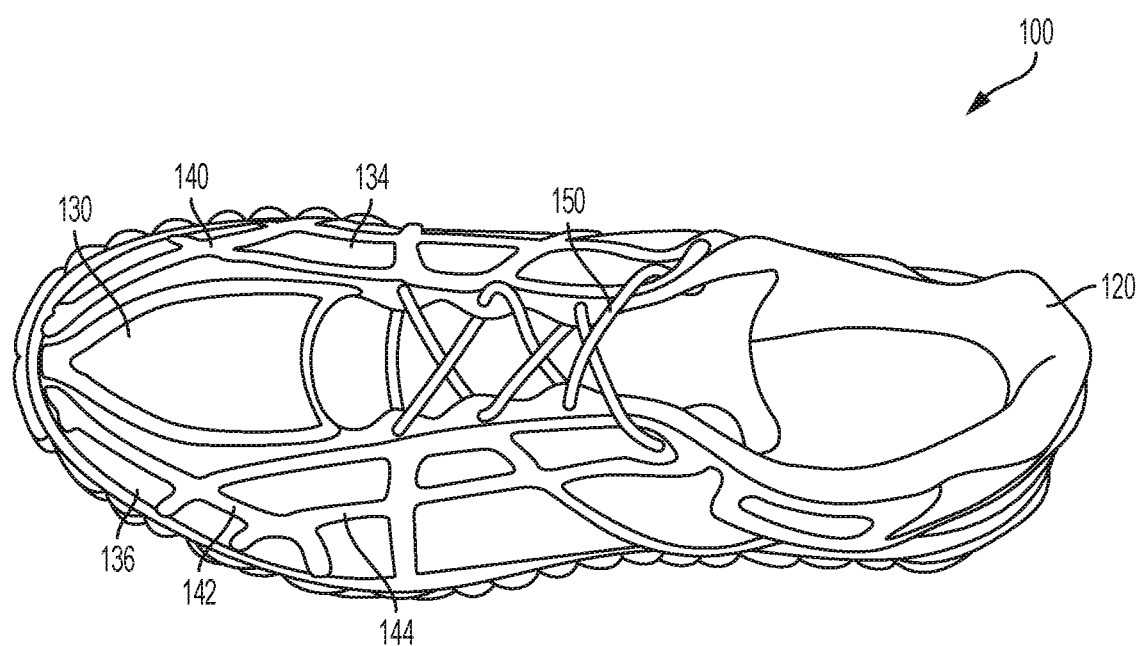
FIG. 6 shows a top view of an article of footwear according to some embodiments.

In some embodiments, extruded component 112 provides a base component or layer around which the rest of sole 110 is made (see FIGS. 24-28). For example, in some embodiments, additional layers of extruded component(s) may be deposited adjacent to extruded component 112 to form a portion of sole 110, such as a midsole. For example, one or more layers 114 of extruded component may be deposited adjacent to extruded component 112. In some embodiments, layers 114 provide a midsole of sole 110. In some embodiments, layers 114 are formed from one continuous extruded component. In some embodiments, each layer 114 is formed from a separate continuous extruded component. In some embodiments, as shown in FIGS. 4 and 5, the number of layers 114 varies along a length of the article of footwear 100. In some embodiments, the extruded component of layers 114 may be extruded in a pattern, such as a loop-forming pattern back and forth across article of footwear 100 (e.g., in a longitudinal direction, a transverse direction, or an angled direction between a longitudinal direction and a transverse direction). In some embodiments, the extruded component of layers 114 extends from a heel area of article of footwear 100 to a toe area of the article of footwear 100.

In some embodiments, the extruded component of layers 114 is discontinuous such that there are separate heel and forefoot extruded components. In some embodiments, the extruded component of layers 114 is positioned only in a portion of sole 110 (e.g., heel area only, midfoot area only, forefoot area only, or a combination thereof). In some embodiments, other portions of sole 110 may be made of foam. For example, article of footwear 100 may include the extruded component of layers 114 only in the heel of sole 110 with foam in the forefoot of sole 110. As another example, article of footwear 100 may include the extruded component of layers 114 only in the forefoot of sole 110 with foam in the heel of sole 110. In some embodiments, there may be more layers 114 in the heel of sole 110 than in the forefoot of sole 110 to create a heel lift. In some embodiments, a heel lift may be created with the same number of layers 114 in the heel of sole 110 and in the forefoot of sole 110, but with the nozzle running faster in the forefoot and slower in the heel.

Figure 7:
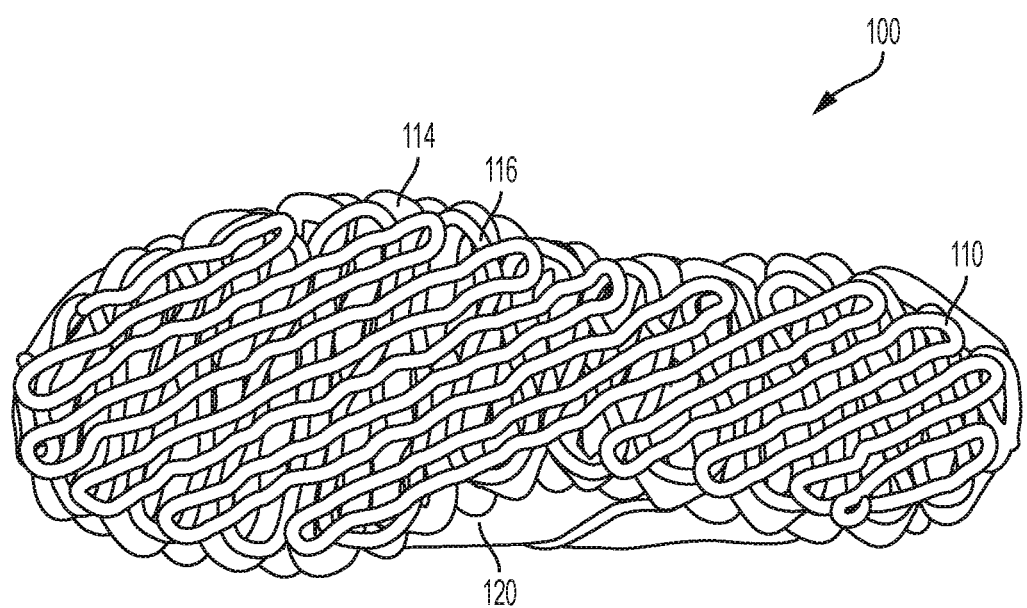
FIG. 7 shows a bottom view of an article of footwear according to some embodiments.

In some embodiments, one or more layers 116 of extruded component are deposited adjacent to layers 114 (i.e., underneath layers 114). In some embodiments, layers 116 provide an outsole of sole 110. In some embodiments, layers 116 are formed from one continuous extruded component. In some embodiments, each layer 116 is formed from a separate continuous extruded component. In some embodiments, the extruded component of layers 116 may be extruded in a pattern, such as an undulating pattern back and forth across article of footwear 100 (e.g., in a longitudinal direction, a transverse direction, or an angled direction between a longitudinal direction and a transverse direction). For example, as shown in FIG. 7, sole 110 includes a layer 116 of an extruded component that extends back and forth in a transverse direction across article of footwear 100 in an undulating pattern and a layer 116 of an extruded component that extends back and forth in an angled direction (between the longitudinal and transverse directions) across article of footwear 100 in an undulating pattern. In some embodiments, layers 116 differ from layers 114 in at least one characteristic (e.g., color, density, shape, size, material composition, etc.). In some embodiments, layers 116 comprise a ground-contacting surface of article of footwear 100.

Figure 12:
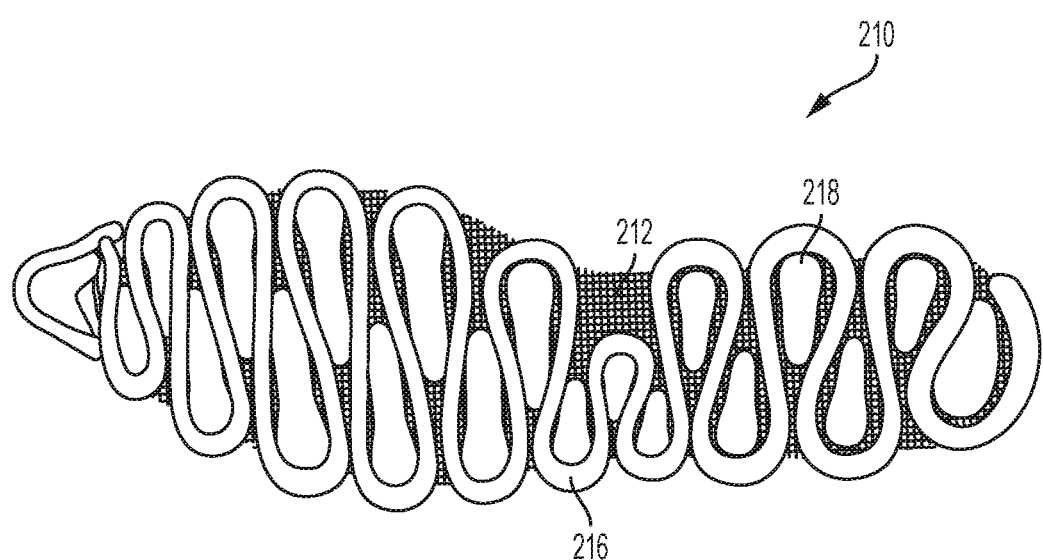
FIG. 12 shows a bottom view of a sole for an article of footwear according to some embodiments.
Figure 13:
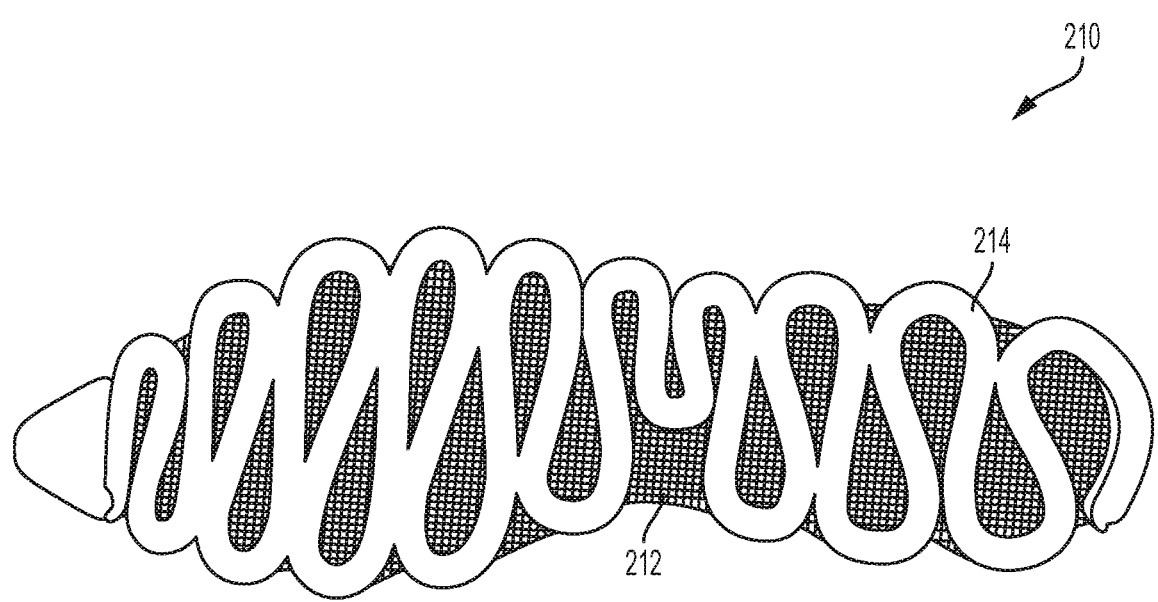
FIG. 13 shows a top view of a sole for an article of footwear according to some embodiments.
Figure 14:
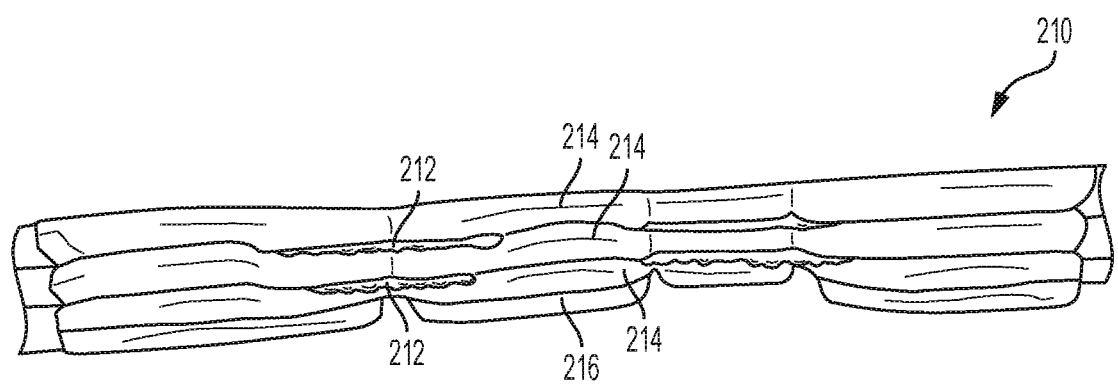
FIG. 14 shows a side view of a sole for an article of footwear according to some embodiments.

In some embodiments, sole 110 is made entirely of extruded components. For example, layers 114, layer 116 and extruded component 112 may make up the entirety of sole 110. In some embodiments, other materials or layers may be included in sole 110. For example, as shown in FIGS. 12-14, a sole 210 for an article of footwear can include one or more extruded components formed in a controlled geometric pattern along with layers of non-extruded material. In some embodiments, sole 210 can include one or more layers. In some embodiments, one or more of the layers may comprise an extruded member. In some embodiments, one or more of the layers may comprise a material that is not extruded. For example, in some embodiments, sole 210 includes layers 212 that comprise a material that is not extruded and layers 214 and/or layers 216 that comprise an extruded material. In some embodiments, layers 214 may have similar characteristics as layers 114. In some embodiments, layers 216 may have similar characteristics as layers 116. In some embodiments, the extruded components of layers 214 and 216 may be aligned with each other such that they follow the same pattern. In some embodiments, sole 210 comprises cushioning elements 218, as shown in FIG. 12. In some embodiments, cushioning elements 218 comprises an extruded component. For example, cushioning elements 218 may be extruded into loops formed by layer 216. In some embodiments, layer 216 and/or cushioning element 218 comprise a ground-contacting surface of the article of footwear.

In some embodiments, sole 210 comprises alternating layers (i.e., layers that comprise an extruded member (layers 214 and/or layers 216) alternating with layers that do not comprise an extruded member (layer 212)). For example, as shown in FIG. 14, sole 210 comprises layer 214, layer 212, layer 214, layer 212, layer 214, and layer 216, in that order. Thus, layers 212 may be disposed between layers of extruded members (i.e., layers 214).

For example, in some embodiments, a first layer 214 may be extruded in a controlled geometric pattern. In some embodiments, a layer 212 may then be placed adjacent to first layer 214. In some embodiments, a second layer 214 may then be extruded over layer 212 and first layer 214. As the second layer 214 hardens, layer 212 is secured between two extruded components. In some embodiments, this arrangement allows for components to be embedded within a midsole of an article of footwear. In some embodiments, layers 212 comprise a mesh material. In some embodiments, layers 212 comprise a nonwoven layer. In some embodiments, layer 212 may be a film, a textile, a molded component, or other suitable material. In some embodiments, layers 212 may extend beyond sole 210. For example, layers 212 may extend up and attach to or form part of an upper. In some embodiments, other components (other than layer 212) may be disposed between layers 214 or between two or more extruded components.

Figure 15A:
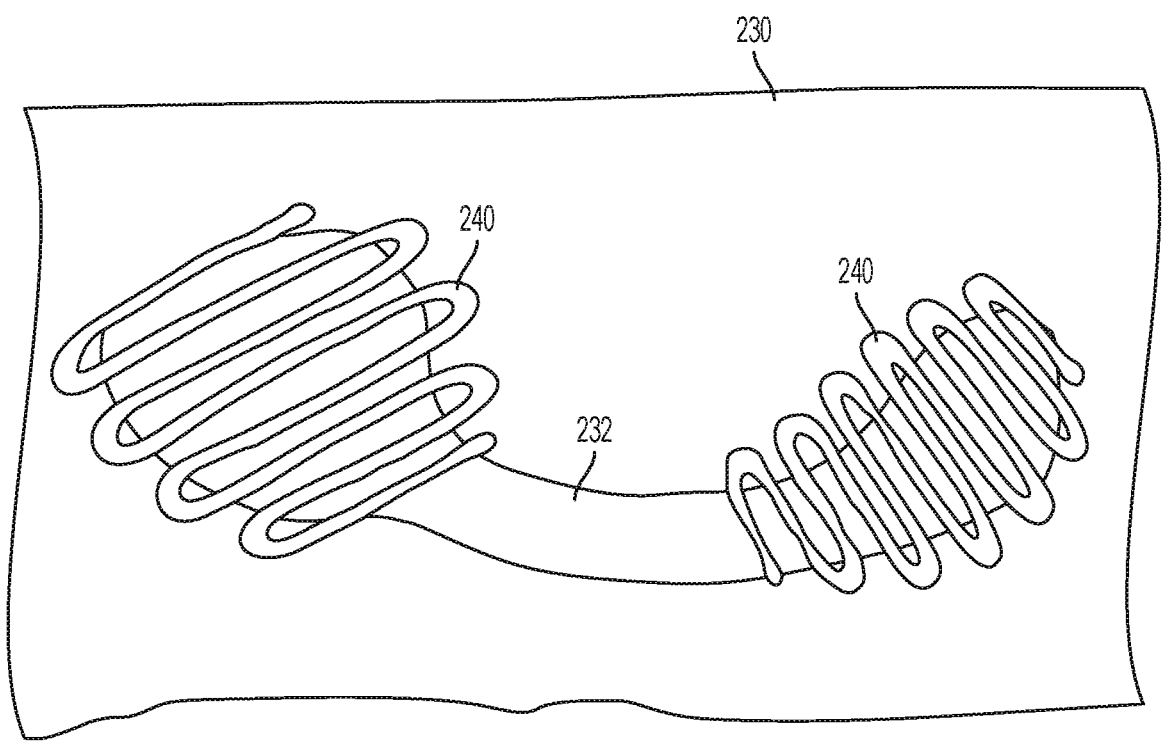
FIGS. 15A-15I show portions of an upper with an extruded component according to some embodiments.
Figure 15B:
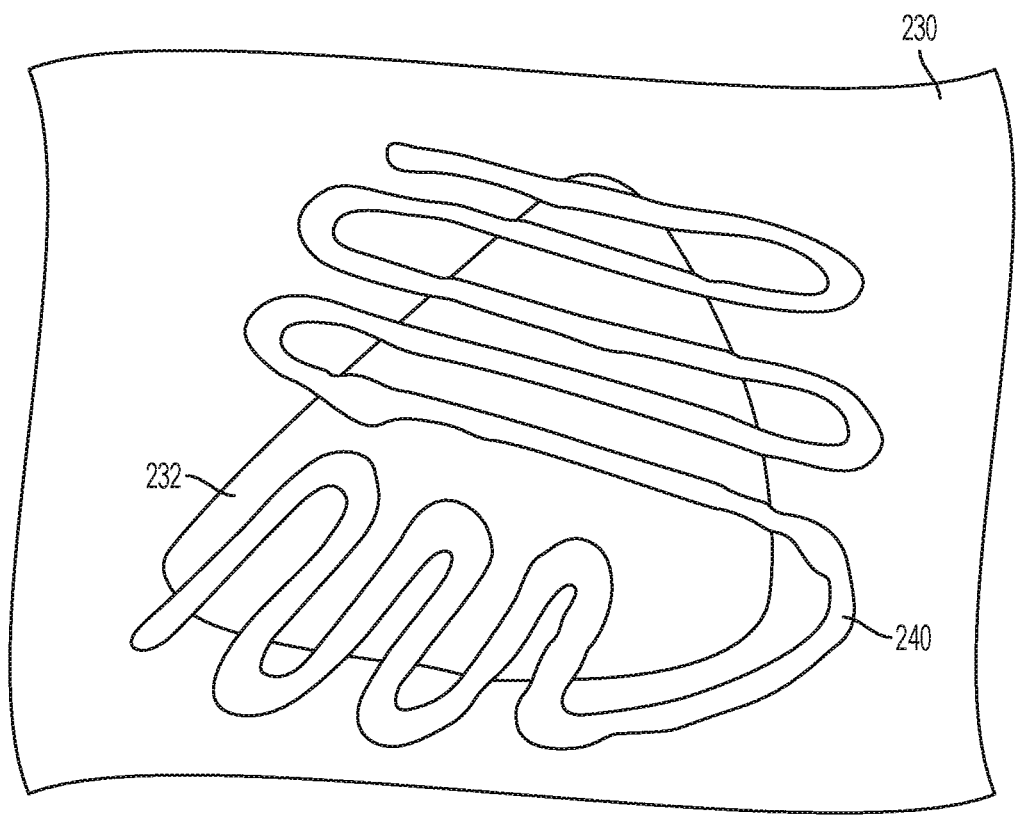
Figure 15C:
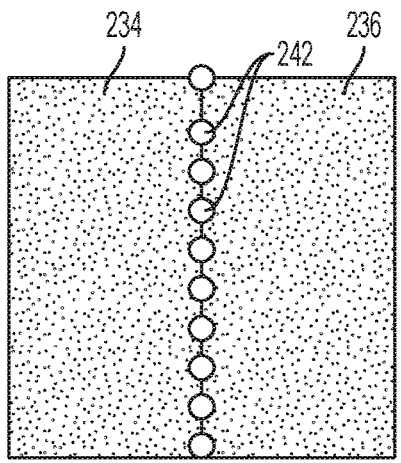
Figure 15D:
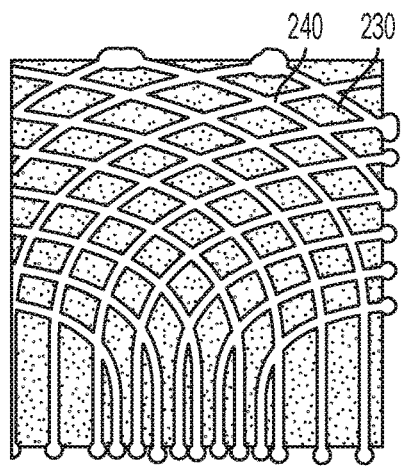
Figure 15E:
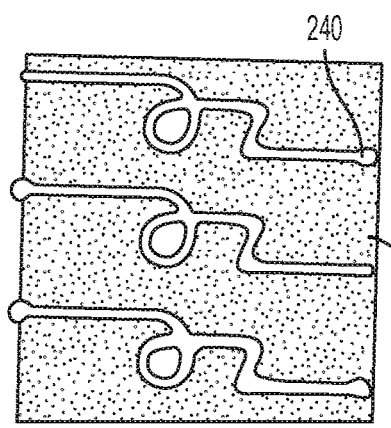
Figure 15F:
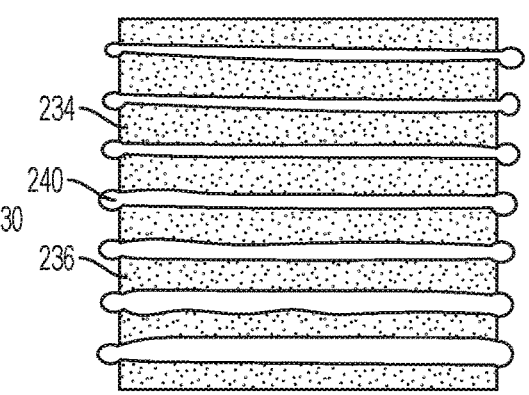
Figure 15G:
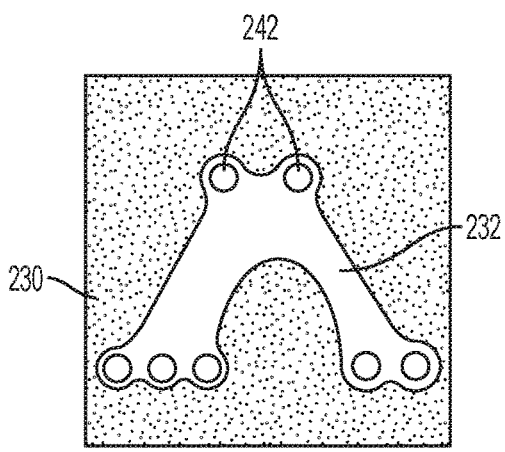
Figure 15H:
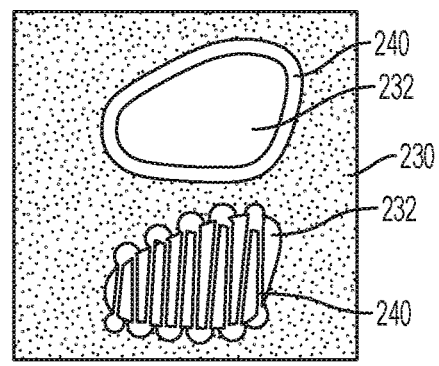
Figure 15I:
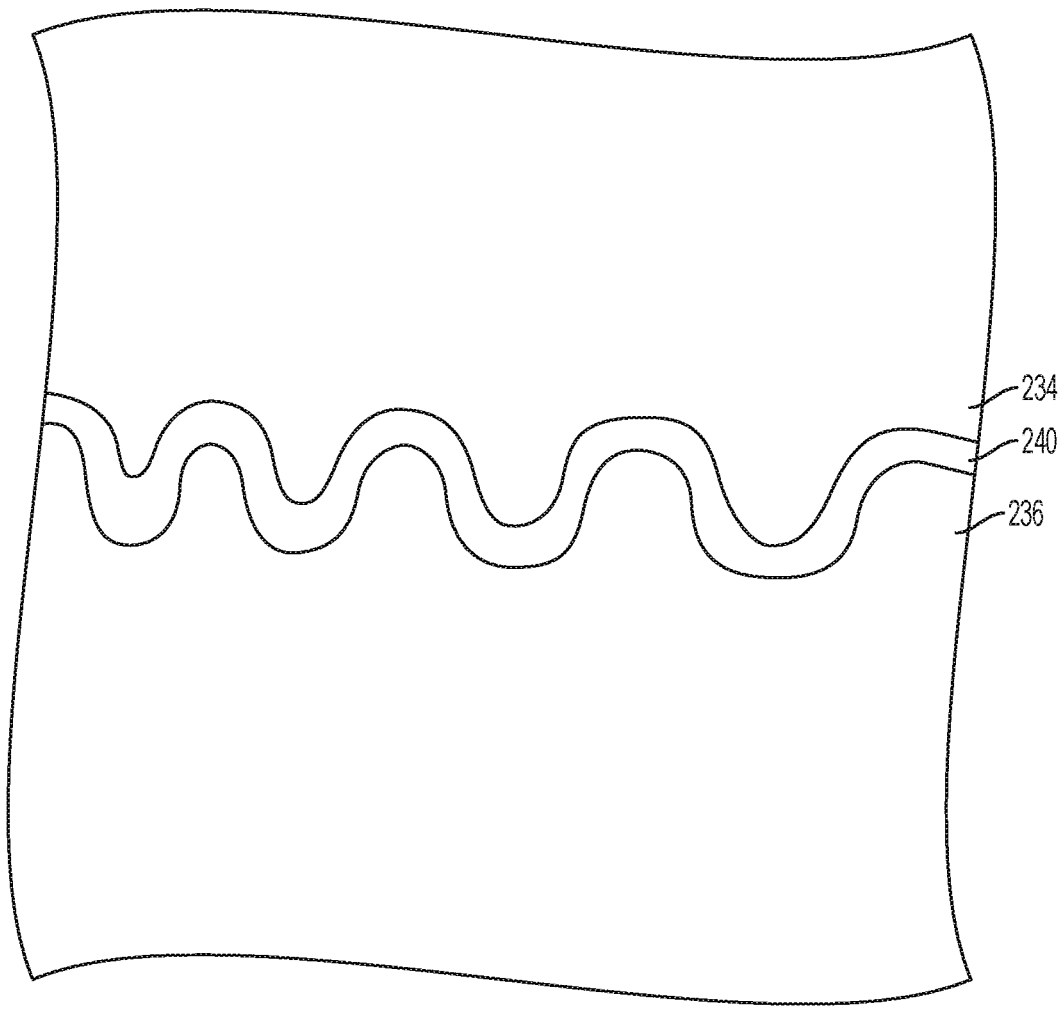

In some embodiments, as shown, for example, in FIGS. 15A-15I, extruded components 240 may be deposited in a variety of designs. In some embodiments, extruded component 240 may be deposited in a back and forth undulating pattern to secure upper parts 232 to a portion 230 of an upper. In some embodiments, extruded component 240 secures parts 232 to reduce stretching or moving of parts 232 around on the upper. In some embodiments, part 232 comprises a tip of the upper, as shown in FIG. 15A. In some embodiments, part 232 comprises a counter of the upper, as shown in FIG. 15B. In some embodiments, as shown in FIG. 15C, a non-continuous extruded component 242 may join panels 234 and 236 together. For example, a plurality of deposits of non-continuous extruded component 242 along a border between panels 234 and 236 may join panels 234 and 236 together. In some embodiments, as shown in FIGS. 15D and 15E, extruded component 240 may provide a pattern on a portion 230 of an upper. In some embodiments, as shown in FIG. 15F, extruded component 240 may provide a pattern and join panels 234 and 236 together. In some embodiments, as shown in FIG. 15G, non-continuous extruded component 242 may secure part 232 onto a portion 230 of an upper without being deposited along a border of part 232, for example, if part 232 comprises a mesh material. Alternatively, there may be a cut-out or a void in part 232 for the material of non-continuous extruded component 242 (e.g., extruded dots) to flow into and bond to portion 230 of an upper. In some embodiments, as shown in FIG. 15H, some parts 232 may be joined to portion 230 of the upper by an extruded component 240 deposited along a border of part 232, while other parts 232 may be joined to portion 230 of the upper by an extruded component deposited back and forth across part 232. In some embodiments, as shown in FIG. 15I, the border between panels 234 and 236 may not be straight. For example, the border between panels 234 and 236 may curve back and forth. In some embodiments, extruded component 240 may curve back and forth along the border between panels 234 and 236.

In some embodiments, a segment of an extruded component may bond or stick to an article of footwear and another segment of the extruded component may not bond or stick to the article of footwear. In some embodiments, having a bonded segment and a non-bonded segment of the extruded component allows a designated part of the article of footwear (e.g., the substrate) to stretch and move independently from the extruded component (and/or where the extruded component bonds to the substrate). In some embodiments, the non-bonded segment of the extruded component may extend over a hole or void in the upper (and/or substrate). In some embodiments, the non-bonded segment of the extruded component may extend over a tongue of the upper. For example, the extruded component may be bonded to an article of footwear on both a medial side and a lateral side (e.g., at the feather line, at the quarters, etc.) and include a non-bonded segment that extends over a tongue of the upper. In some embodiments, the non-bonded segment of the extruded component may extend over a portion of the upper to provide stress relief.

Figure 32:
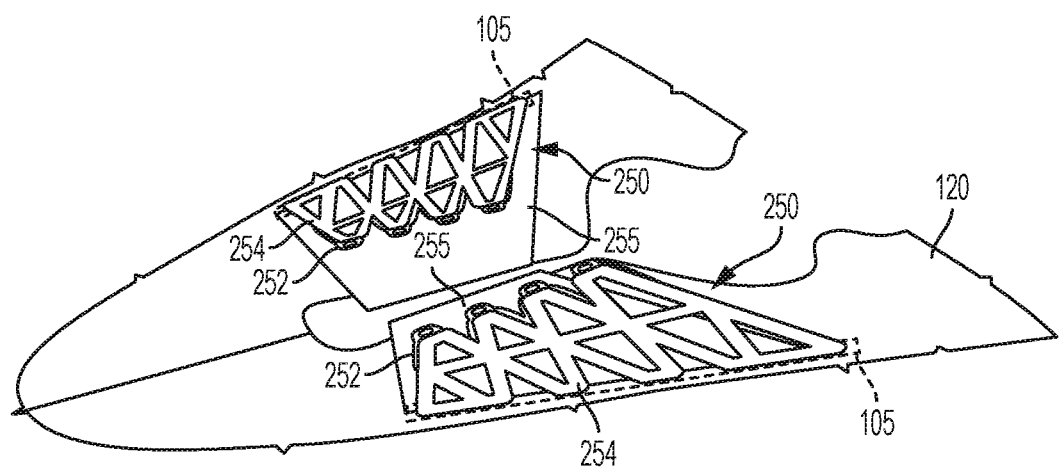
FIG. 32 shows an upper support element and an upper layout for an article of footwear according to some embodiments.

In some embodiments, to form the non-bonded segment of the extruded component, the component is extruded over a non-stick material (see FIG. 32). A non-stick material is any material that does not bond with the extruded component as it hardens. In some embodiments, the non-stick material may be removed after the extruded component has hardened, thus leaving a non-bonded segment of the extruded component. In some embodiments, the non-stick material may be a temporary insert made from polytetrafluoroethylene (PTFE), or other suitable non-stick material. In some embodiments, the non-stick material may be screen printed or sprayed over a portion of the article of footwear, such as a portion of a panel. In some embodiments, a last on which the component is extruded may be made of or coated with the non-stick material. In some embodiments, the article of footwear may have an upper that is completely knit (e.g., flat knit, circular knit, etc.) with areas of the knit upper comprising yarns that are inherently non-stick (e.g., PTFE yarns, polyolefin yarns, ultra-high-molecular-weight polyethylene (UHMWPE) yarn). In some embodiments, the upper may include woven, non-woven, or knit sections that are entirely made from non-stick yarns that are seamed together (i.e., stitched) to other upper panels that are made from traditional yarns (i.e., polyester, nylon, etc.) that may or may not be coated with the non-stick material.

Figure 34:
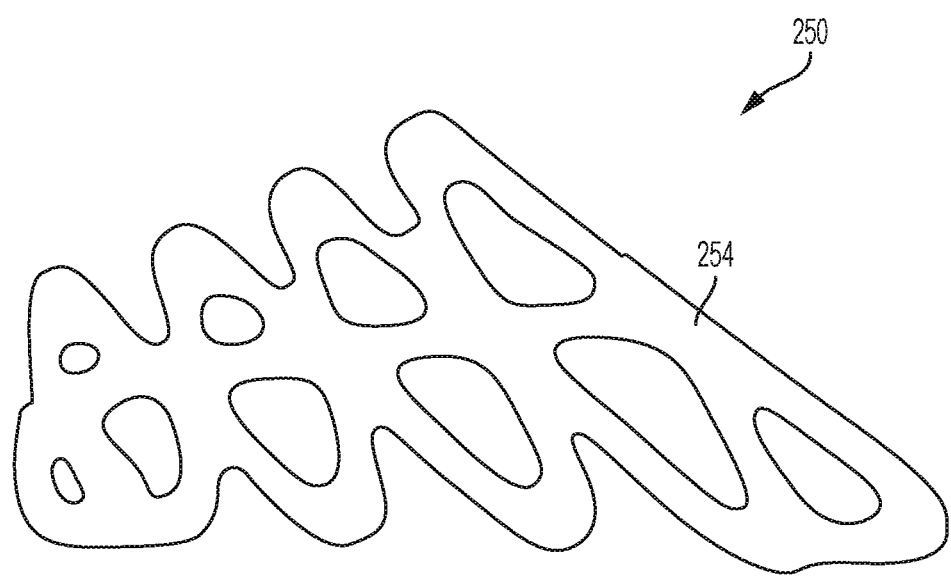
FIG. 34 shows an upper support element for an article of footwear made with an extruded component according to some embodiments.

In some embodiments, an entire extruded component 254 may be made as a non-bonded segment (i.e., the extruded component is dispensed only over a non-stick material to form a stand-alone component), as shown, for example, in FIG. 34. In some embodiments, the extruded component 254 may then be attached to an article of footwear. For example, the extruded component 254 may be attached to an article of footwear as an upper support element 250. In some embodiments, an extruded component that is a stand-alone component may be attached to an article of footwear as a heel counter.

Figure 16:
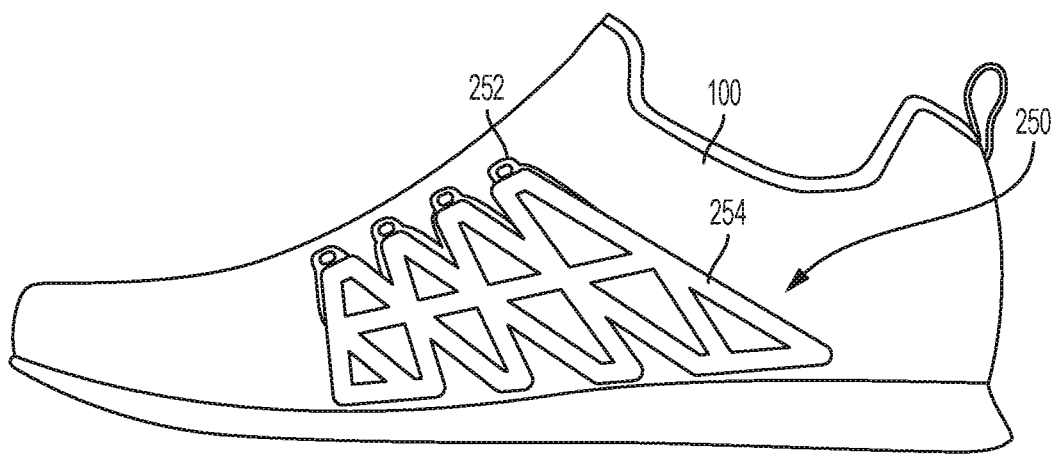
FIG. 16 shows an article of footwear having an upper support element with an extruded component according to some embodiments.
Figure 17:
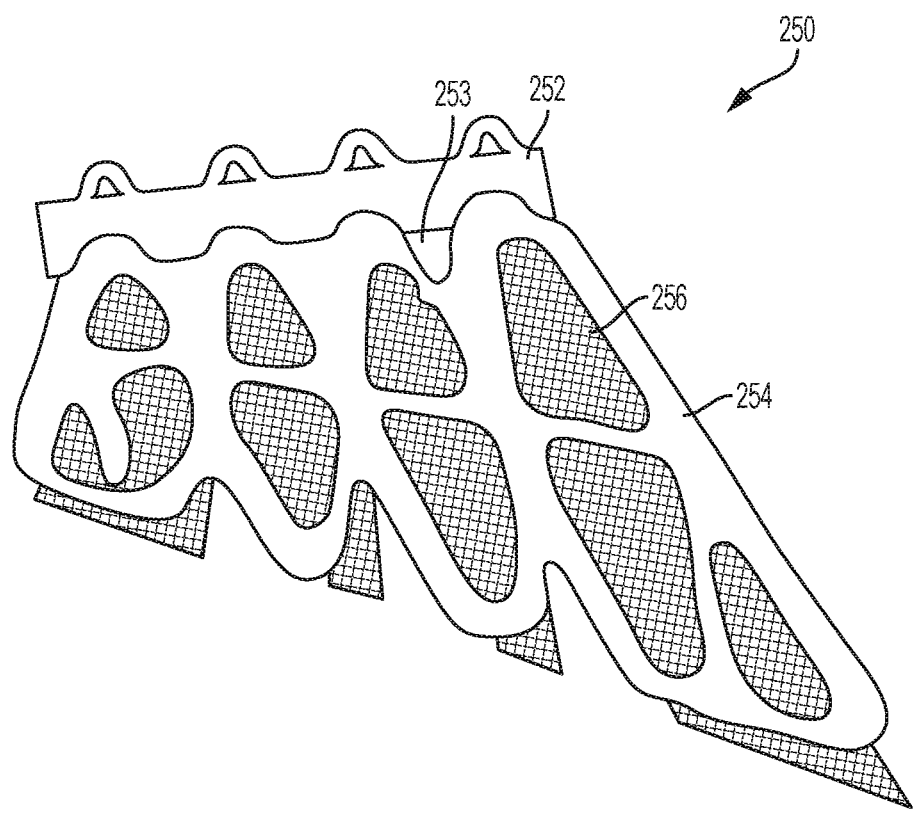
FIG. 17 shows an upper support element for an article of footwear made with an extruded component according to some embodiments.

In some embodiments, as shown, for example, in FIG. 16, a non-bonded segment of an extruded component 254 may form an upper support element 250 of article of footwear 100. In some embodiments, upper support element 250 may provide support to the wearer in the midfoot region of article of footwear 100. In some embodiments, upper support element 250 comprises a non-extruded component 252. In some embodiments, non-extruded component 252 comprises loops to receive laces. In some embodiments, as shown in FIG. 17, upper support element 250 may comprise an additional layer 256. In some embodiments, extruded component 254 is bonded to additional layer 256. In some embodiments, additional layer 256 comprises a mesh material.

Figure 18:
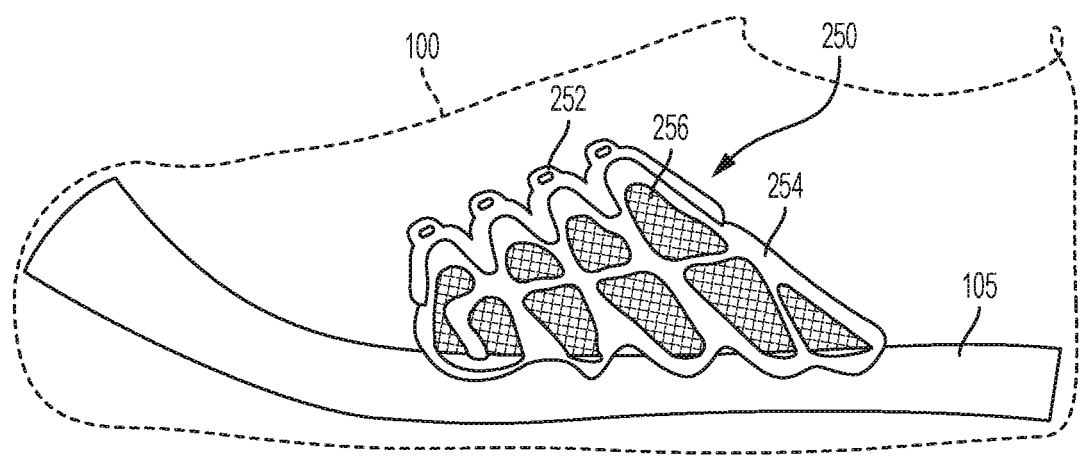
FIG. 18 shows an upper support element for an article of footwear made with an extruded component according to some embodiments.

In some embodiments, upper support element 250 is attached to article of footwear 100. In some embodiments, as shown in FIG. 18, upper support element 250 is attached to article of footwear 100 at attachment portion 105 of article of footwear 100. In some embodiments, attachment portion 105 comprises part of the upper of article of footwear 100. In some embodiments, attachment portion 105 comprises part of the sole of article of footwear 100. In some embodiments, attachment portion 105 is any other part of article of footwear 100 (e.g., between the sole and the upper). In some embodiments, attachment portion 105 may be disposed between the sole and the upper at the feather line of the article of footwear. In some embodiments, attachment portion 105 is tucked under portions of the upper and/or sole. For example, attachment portion 105 may be tucked under the midsole. In some embodiments, attachment portion 105 is bonded to an extruded component of the sole.

Figure 29:
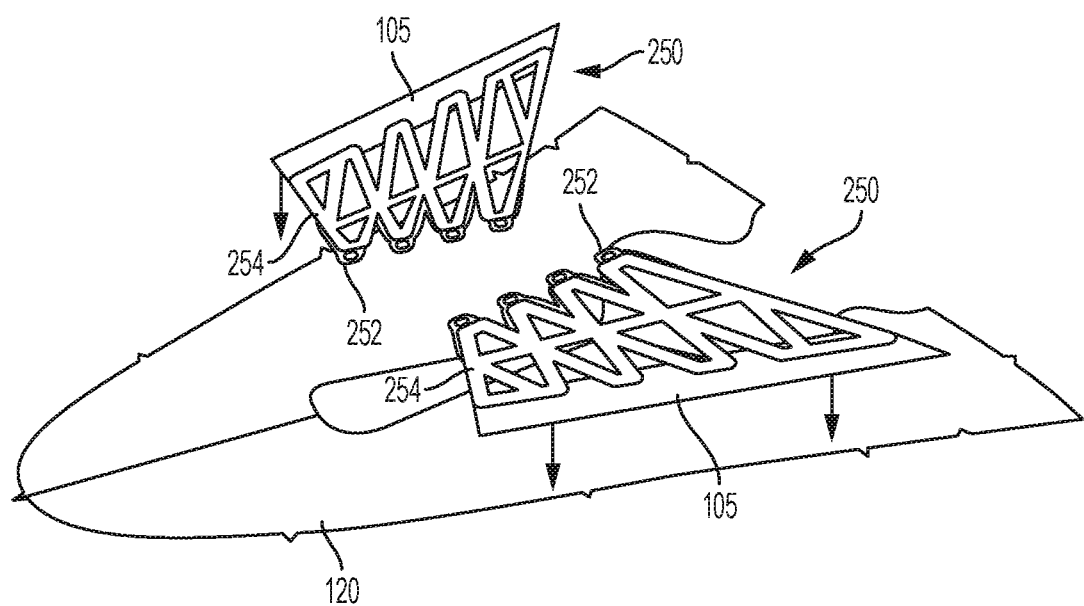
FIG. 29 shows an upper support element and an upper layout for an article of footwear according to some embodiments.
Figure 30:
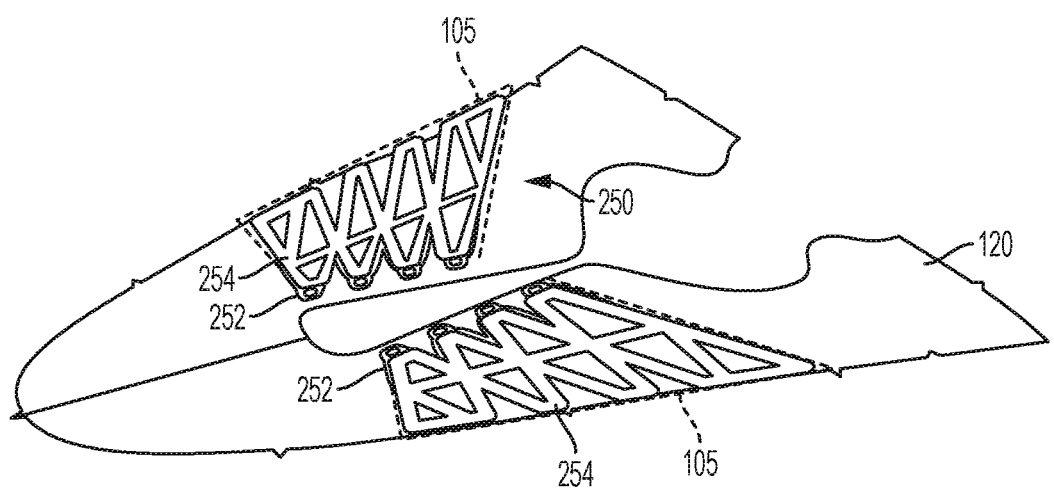
FIG. 30 shows an upper support element and an upper layout for an article of footwear according to some embodiments.
Figure 31:
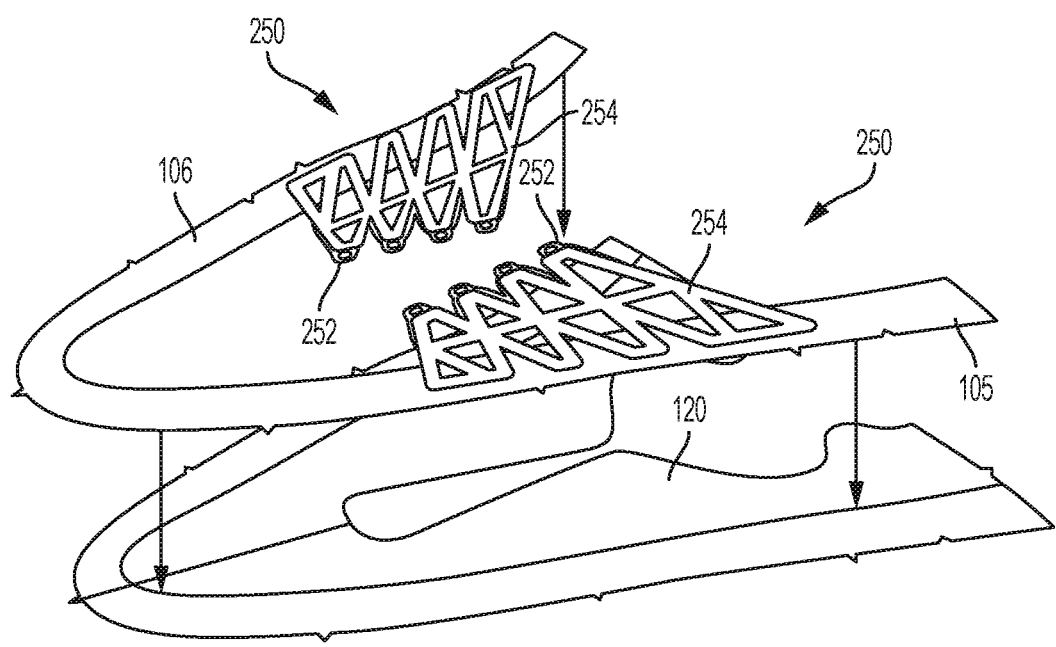
FIG. 31 shows an upper support element and an upper layout for an article of footwear according to some embodiments.

In some embodiments, attachment portion 105 is stitched to article of footwear 100. In some embodiments, attachment portion 105 is adhered to article of footwear 100 with an adhesive. For example, as shown in FIG. 29, upper support element 250 is bonded to attachment portion 105 via extruded component 254 and attachment portion 105 is then attached to the rest of an upper 120 (e.g., via stitching, joined with an adhesive, laser-welded, ultrasonically welded, radio-frequency welded, low-melt film or any other suitable method for joining). In some embodiments, attachment portion 105 is an integral part of article of footwear 100 and upper support element 250 is attached to article of footwear 100 via extruded component 254 (i.e., extruded component 254 bonds with attachment portion 105 as extruded component 254 hardens). For example, as shown in FIGS. 30 and 32, attachment portion 105 may be a part of upper 120. In some embodiments, extruded component 254 bonds directly to upper 120. In some embodiments, extruded component 254 does not include a non-bonded segment (see FIG. 30). In some embodiments, extruded component 254 includes a non-bonded segment (see FIG. 32). For example, a removable non-stick component 255 may be inserted under portions of extruded component 254. In some embodiments, as shown in FIG. 31, attachment portion 105 comprises the randing 106 of article of footwear. Extruded component 254 may bond directly with randing 106. Other means of attaching upper support element 250 to article of footwear 100 may also be used.

Figure 20:
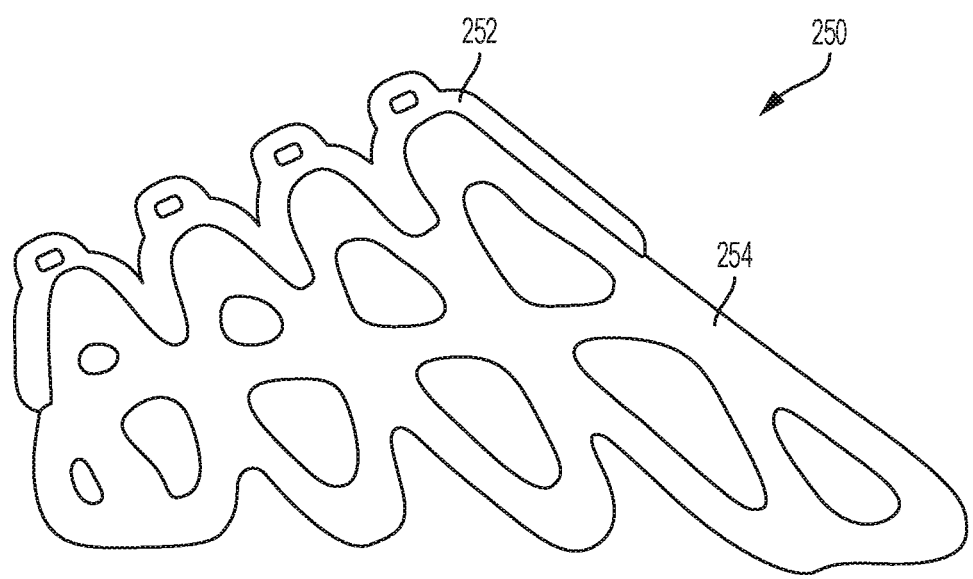
FIG. 20 shows an upper support element for an article of footwear made with an extruded component according to some embodiments.

In some embodiments, a portion of non-extruded component 252 may be embedded within extruded component 254. Non-extruded component 252 may take a variety of forms. In some embodiments, non-extruded component 252 may comprise a piece of fabric that extends from extruded component 254 and includes a plurality of loops to receive laces, as shown, for example, in FIGS. 16, 18, and 20.

In some embodiments, non-extruded component 252 may comprises a strip of fabric that extends across the top of extruded component 254 and includes a plurality of loops to receive laces, as shown in FIG. 17.

Figure 19:
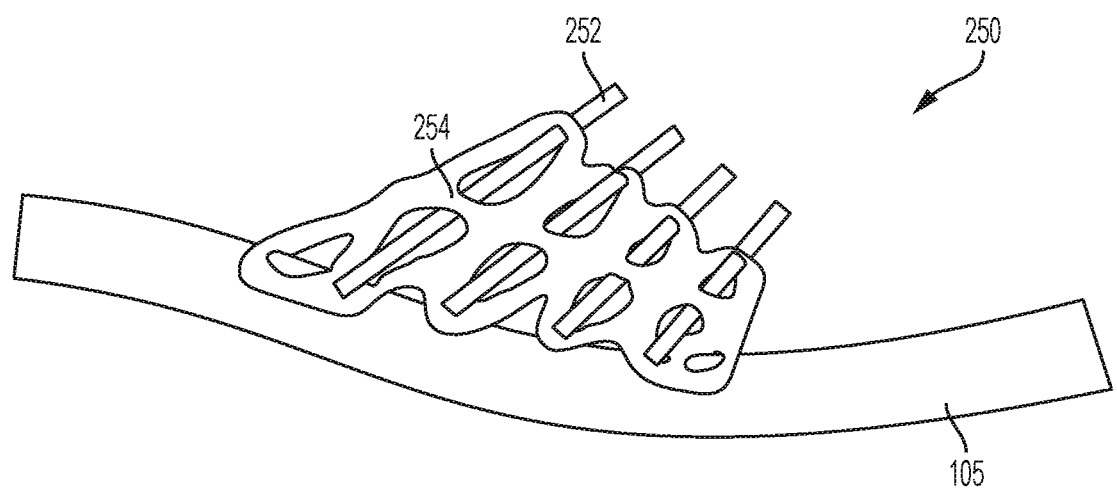
FIG. 19 shows an upper support element for an article of footwear made with an extruded component according to some embodiments.
Figure 21:
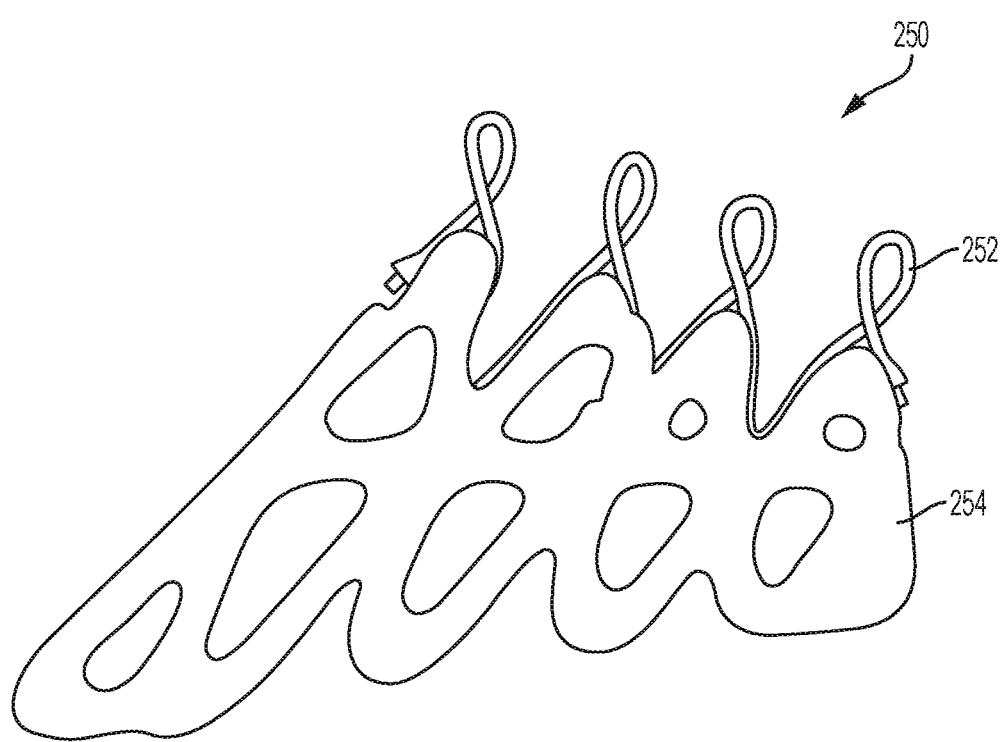
FIG. 21 shows an upper support element for an article of footwear made with an extruded component according to some embodiments.
Figure 22:
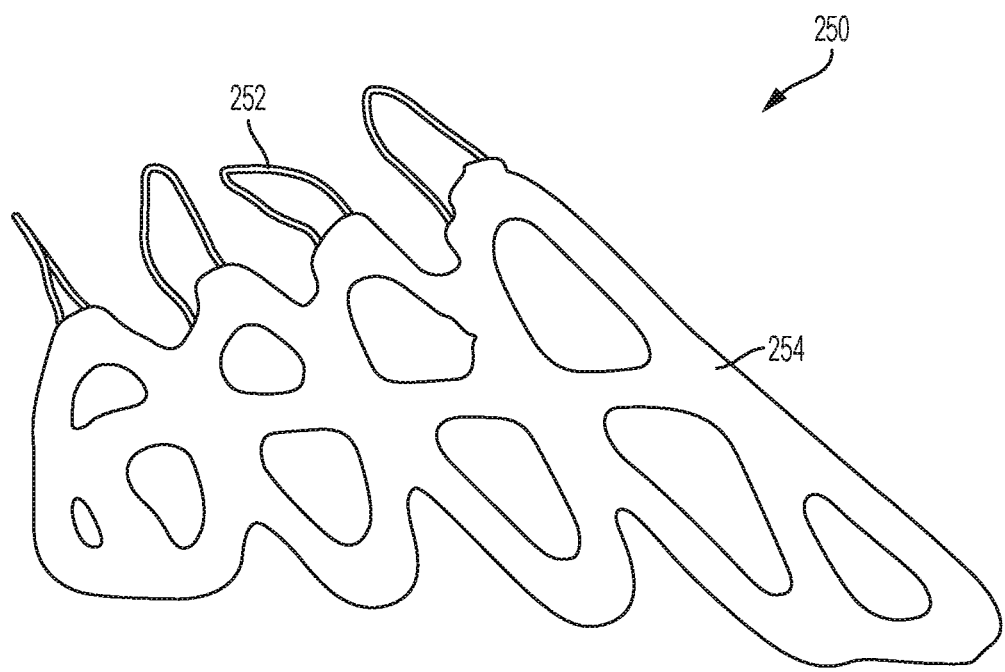
FIG. 22 shows an upper support element for an article of footwear made with an extruded component according to some embodiments.

In some embodiments, a gap 253 separates part of non-extruded component 252 from extruded component 254. In some embodiments, non-extruded component 252 comprises a plurality of strips of material that extend from the bottom of extruded component 254 to beyond the top of extruded component 254, as shown in FIG. 19. In some embodiments, each strip of material comprises a loop to receive laces In some embodiments, non-extruded component 252 comprises a yarn, thread, or string that extends across the top of extruded component 254, as shown in FIGS. 21 and 22. Several portions of the yarn, thread, or string may be bonded with extruded component 254 while several other portions of the yarn, thread, or string are not bonded and form loops to receive laces.

Figure 23:
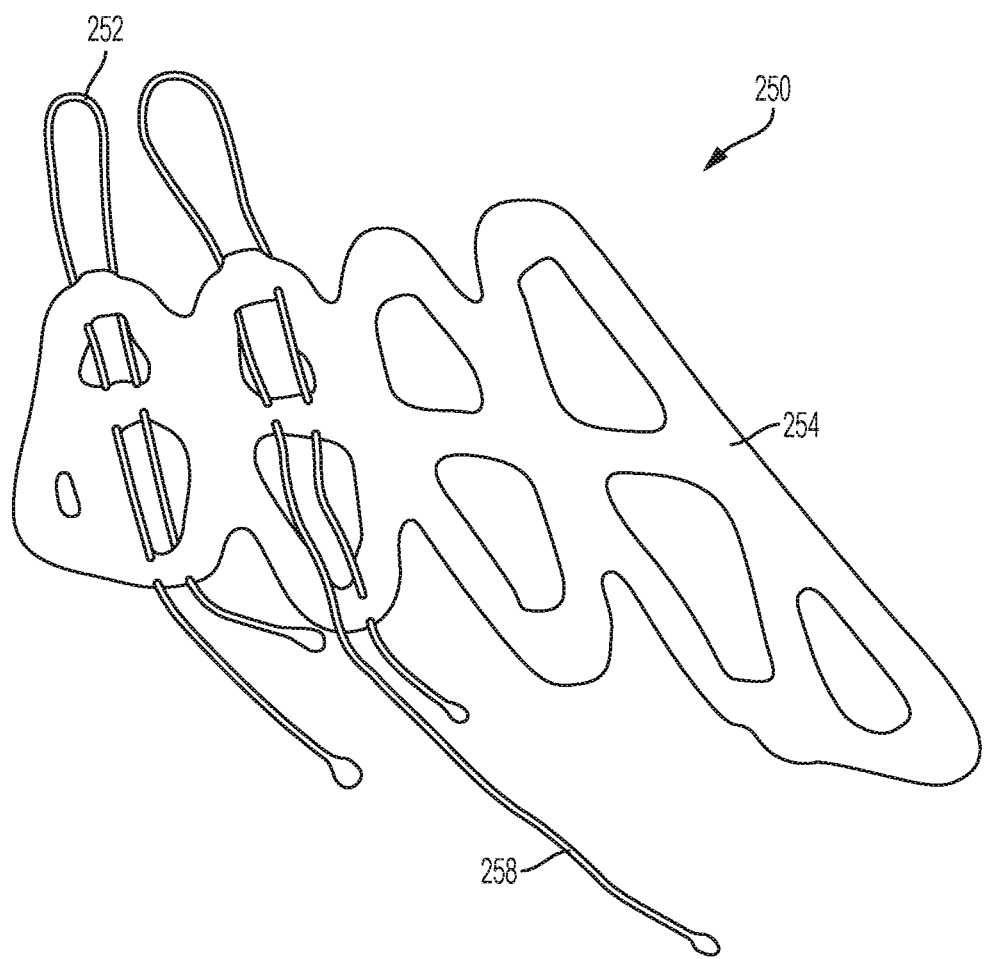
FIG. 23 shows an upper support element for an article of footwear made with an extruded component according to some embodiments.

In some embodiments, non-extruded component 252 comprises a plurality of yarns, threads, or strings that extend from the bottom of extruded component 254 to beyond the top of extruded component 254, as shown in FIG. 23. In some embodiments, the plurality of yarns, threads, or strings also extend beyond the bottom of extruded component 254. In some embodiments, a portion 258 of yarns, threads, or strings is configured to extend underneath upper (e.g., between upper and sole, or within sole).

Figure 24:
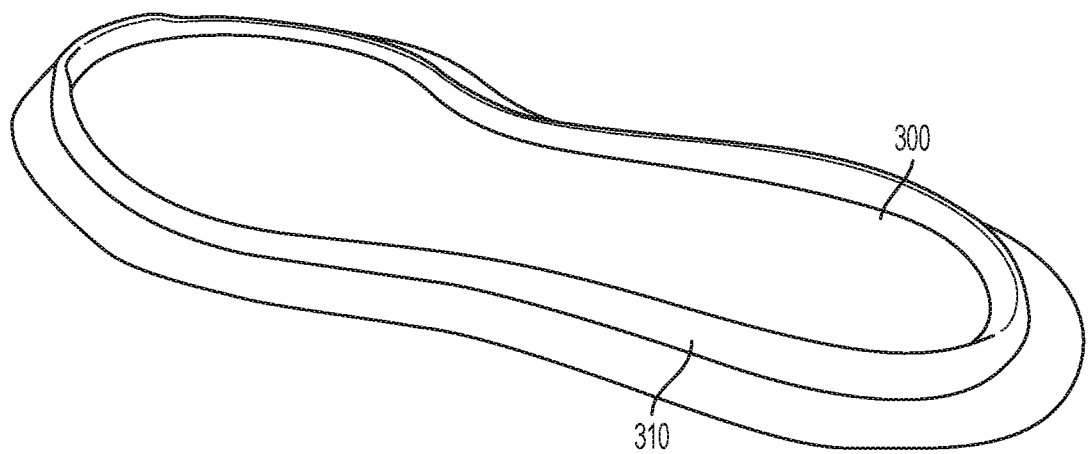
FIG. 24 shows a portion of a sole during the process of creating the sole for an article of footwear according to some embodiments.
Figure 25:
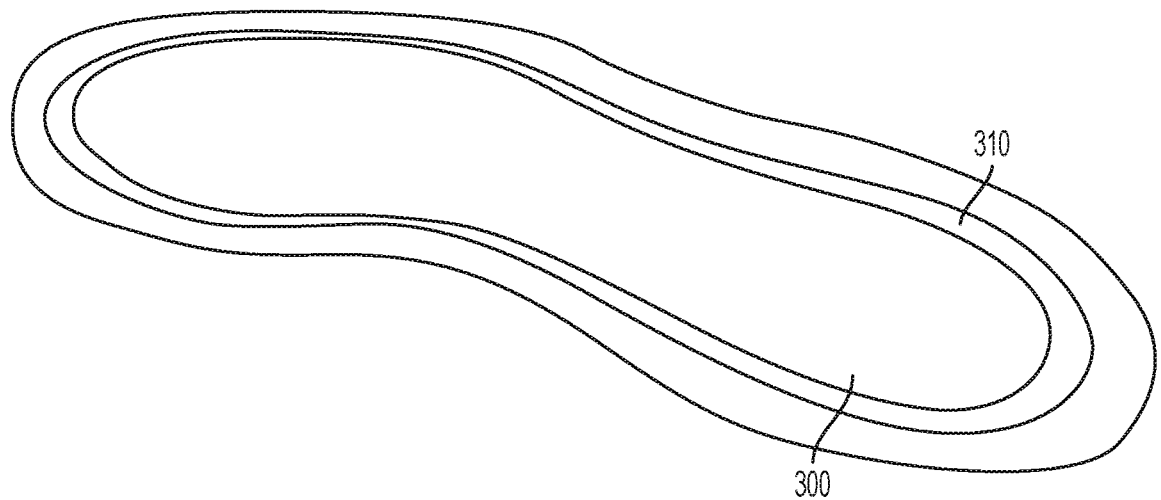
FIG. 25 shows a portion of a sole during the process of creating the sole for an article of footwear according to some embodiments.
Figure 26:
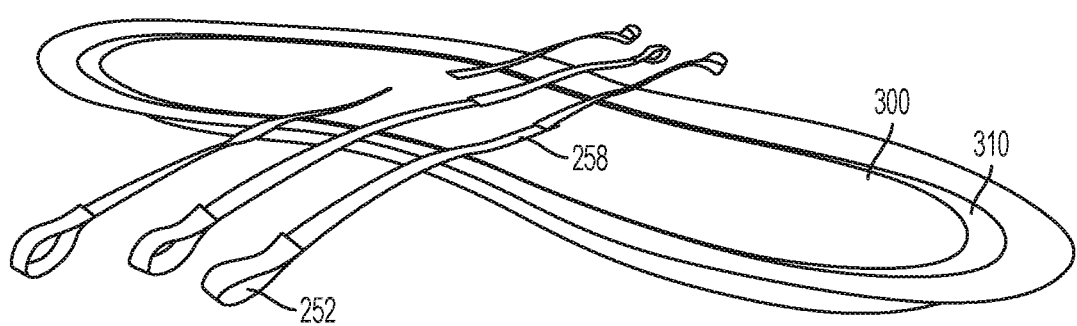
FIG. 26 shows a portion of a sole during the process of creating the sole for an article of footwear according to some embodiments.
Figure 27:
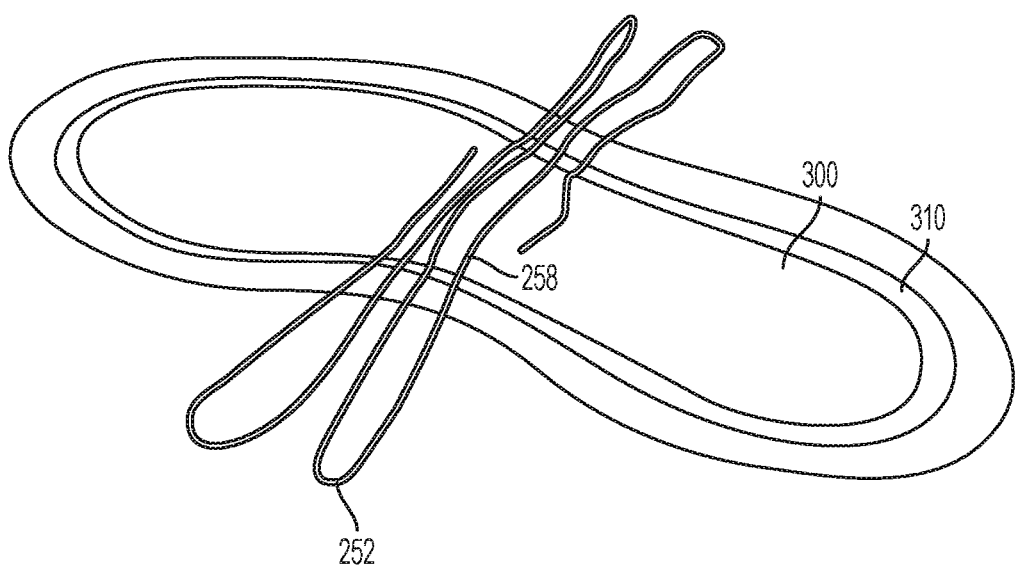
FIG. 27 shows a portion of a sole during the process of creating the sole for an article of footwear according to some embodiments.

For example, as shown in FIGS. 24 and 25, a sole may be formed by vacuum forming a film 300, such as a polyurethane film, and extruding a component 310 into a groove formed in the vacuum formed film 300. In some embodiments, component 310 may be similar to extruded component 112. In some embodiments, one or more non-extruded components 252 may be placed over extruded component 310 and vacuum formed film 300, as shown in FIGS. 26 and 27. In some embodiments, portions 258 of non-extruded components 252 are disposed on an inside of the area formed by extruded component 310.

Figure 28:
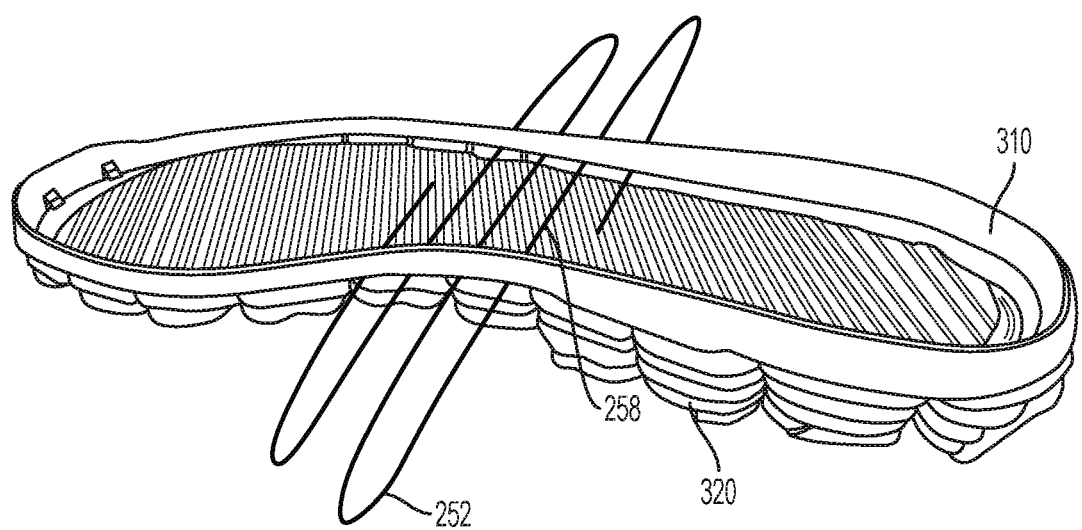
FIG. 28 shows a sole for an article of footwear according to some embodiments.

In some embodiments, as shown in FIG. 28, layers of extruded component 320 may then be extruded over non-extruded component 252 and extruded component 310, thus securing non-extruded component 252 within the sole. Vacuum formed film 300 may be removed (see FIG. 28) after extruded components 310 and/or 320 have set. In some embodiments, instead of placing non-extruded component 252 over extruded component 310, non-extruded component 252 may be placed between layers of extruded component 320. In some embodiments, a sole may be formed without a vacuum formed film (e.g., via plasma coated rapid prototype tooling).

Figure 33:
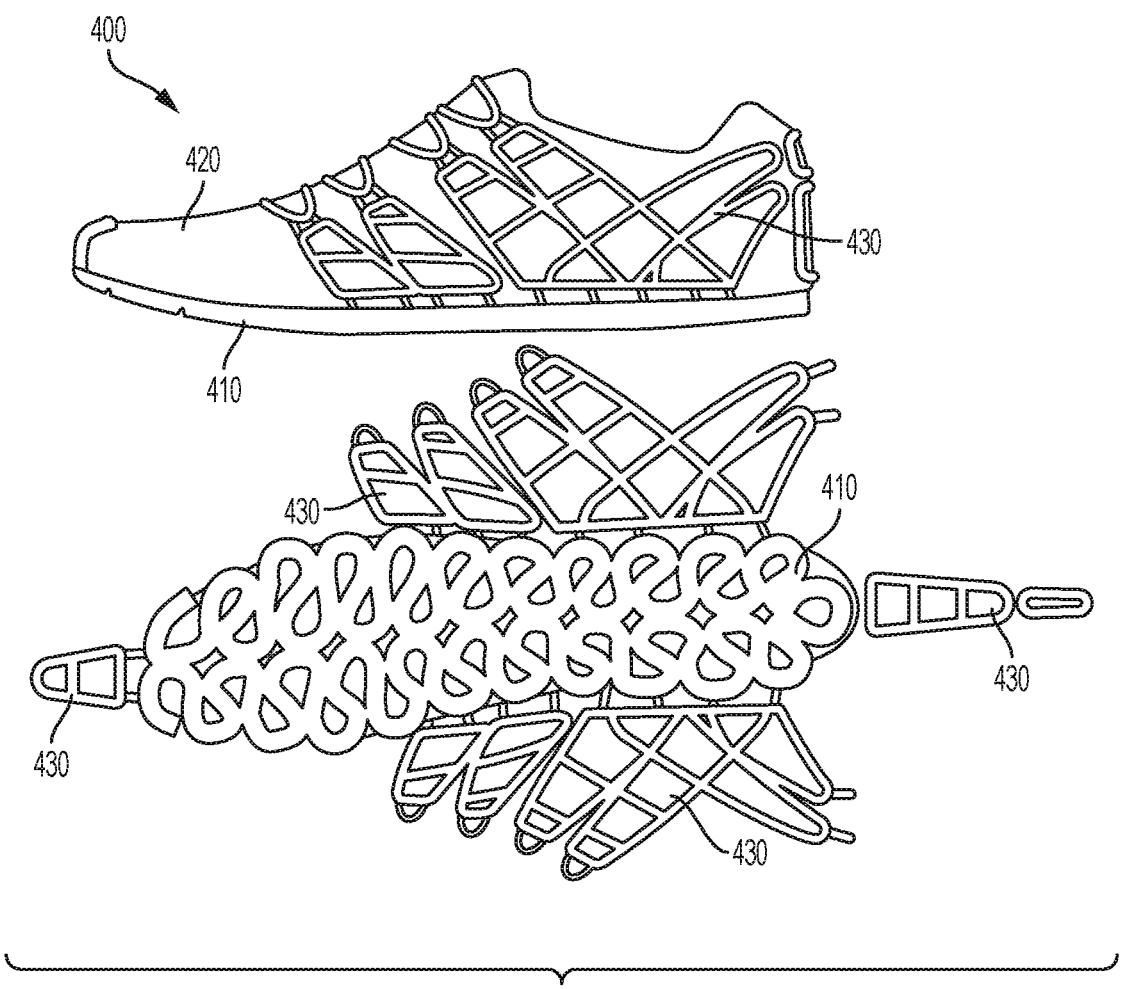
FIG. 33 shows an article of footwear with an extruded component according to some embodiments.

In some embodiments, as shown, for example, in FIG. 33, an article of footwear 400 may comprise a sole 410 and an upper 420. In some embodiments, sole 410 is made of extruded components. In some embodiments, article of footwear 400 may comprise an upper extruded component 430. In some embodiments, upper extruded component 430 may extend from a side of sole 410. In some embodiments, upper extruded component 430 extends above sole 410. In some embodiments, upper extruded component 430 may form a closure system for article of footwear 400. For example, upper extruded component 430 may extend on the sides of upper 420 and have loops to receive laces. In some embodiments, upper extruded component 430 may extend above sole 410 onto upper 420 in a toe region and a heel region of article of footwear 400. In some embodiments, upper extruded component 430 may be bonded to article of footwear 400 at sole 410 and not bonded to article of footwear 400 at upper 420. Thus, in some embodiments, upper 420 can move independent of upper extruded component 430 and upper extruded component 430 can move independent of upper 420. In addition, as shown in FIG. 33, extruded components for sole 410 and upper extruded component 430 may be extruded or dispensed to a single substrate.

Various embodiments described herein allow for joining of individual panels together via an extruded component and allow for the use of shapes and geometries that may be difficult to achieve with conventional molding techniques. Various embodiments described herein provide the use of extruded components to customize articles of footwear. Various embodiments described herein provide extruded components that have segments that are bonded to the article of footwear (e.g., bonded to the sole or upper) and segments that are not bonded. Further variations of the embodiments described above may also be provided.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method of making an article of footwear, the method comprising:
    forming an upper; and
    extruding a component having a first segment, a second segment, an inner surface facing the upper, and an outer surface, wherein the inner surface bonds to the upper at the first segment and does not bond to the upper at the second segment.

2. The method of claim 1, wherein a third segment of the component bonds to the upper, wherein the second segment is between the first and third segments.

3. The method of claim 2, wherein the second segment is disposed over a void in the upper.

4. The method of claim 2, wherein the second segment is disposed over a tongue region of the upper.

5. The method of claim 2, wherein the first segment is disposed on a medial side of the upper and the third segment is disposed on a lateral side of the upper.

6. The method of claim 2, wherein a portion of the upper disposed underneath the second segment is configured to move independently of the second segment.

7. The method of claim 1, wherein the upper comprises a textile fabric.

8. The method of claim 1, wherein the upper comprises a knitted fabric.

9. The method of claim 1, wherein the upper comprises one of a knit, woven, or non-woven material.

10. The method of claim 1, further comprising placing a non-stick material on the upper, wherein the second segment is formed over the non-stick material.

11. The method of claim 10, wherein the non-stick material comprises a coating.

12. The method of claim 11, further comprising removing the non-stick material.

13. The method of claim 11, wherein placing a non-stick material on the upper comprises screen printing the non-stick material on the upper.

14. The method of claim 11, wherein placing a non-stick material on the upper comprises spraying the non-stick material on the upper.

15. The method of claim 11, wherein the non-stick material is bonded to the upper.

16. The method of claim 1, wherein the component is extruded onto the upper after the upper is formed.

* * * * *